US 6,701,682 B2

(12) United States Patent
Ando et al.

(10) Patent No.: US 6,701,682 B2
(45) Date of Patent: Mar. 9, 2004

(54) WORKSPACE SYSTEM FOR IMPROVING PRODUCTIVENESS IN INTELLECTUAL ACTIVITIES

(75) Inventors: Yoichi Ando, Kobe (JP); Kenji Nose, Osaka (JP); Takao Ueda, Osaka (JP); Kiminori Mouri, Osaka (JP); Kyoto Akiyama, Osaka (JP)

(73) Assignee: Itoki Crebio Corporation, Osaka (JP)

( * ) Notice: Subject to any disclaimer, the term of this patent is extended or adjusted under 35 U.S.C. 154(b) by 0 days.

(21) Appl. No.: 09/977,706

(22) Filed: Oct. 16, 2001

(65) Prior Publication Data

US 2002/0045954 A1 Apr. 18, 2002

(30) Foreign Application Priority Data

Oct. 17, 2000 (JP) .................................... 2000-317078
Oct. 23, 2000 (JP) .................................... 2000-322693
Oct. 24, 2000 (JP) .................................... 2000-324020
Oct. 24, 2000 (JP) .................................... 2000-324021

(51) Int. Cl.[7] ................................................. E04H 1/00
(52) U.S. Cl. ............................. 52/234; 52/36.1; 52/36.2
(58) Field of Search ............................... 52/36.1, 36.2, 52/79.1, 234

(56) References Cited

U.S. PATENT DOCUMENTS 3,242,334 A * 3/1966 Hansen .................... 250/504 R
3,498,011 A * 3/1970 Lindgren ....................... 52/31
5,787,648 A * 8/1998 O'Malley ................... 52/36.1
5,897,325 A * 4/1999 Koby-Olson ............... 434/432
6,248,014 B1 * 6/2001 Collier ........................ 454/228
6,474,025 B1 * 11/2002 Faiks et al. ................. 52/36.1

FOREIGN PATENT DOCUMENTS

JP 6-36772 5/1994
JP 11-324364 11/1999

OTHER PUBLICATIONS

English Language Abstracts of JP-A-11-324364.

* cited by examiner

*Primary Examiner*—Carl D. Friedman
*Assistant Examiner*—Basil Katcheves
(74) *Attorney, Agent, or Firm*—Michael D. Bednarek; Shaw Pittman LLP

(57) ABSTRACT

A workspace system includes a working region and a plurality of work surfaces or desktops placed in the working region. The working region provides a first environment suitable for a right hemisphere-dominant job, a second environment suitable for a left hemisphere-dominant job, a third environment different from the first and the second environments, and a seating area in which a job performer takes a seat. Accordingly, the desktops may include a first desktop for the first environment, a second desktop for the second environment, and a third desktop for the third environment. The three working environments are arranged about the seating area. The first, the second and the third desktops are different in e.g. feel, material, shape and color from each other.

19 Claims, 27 Drawing Sheets

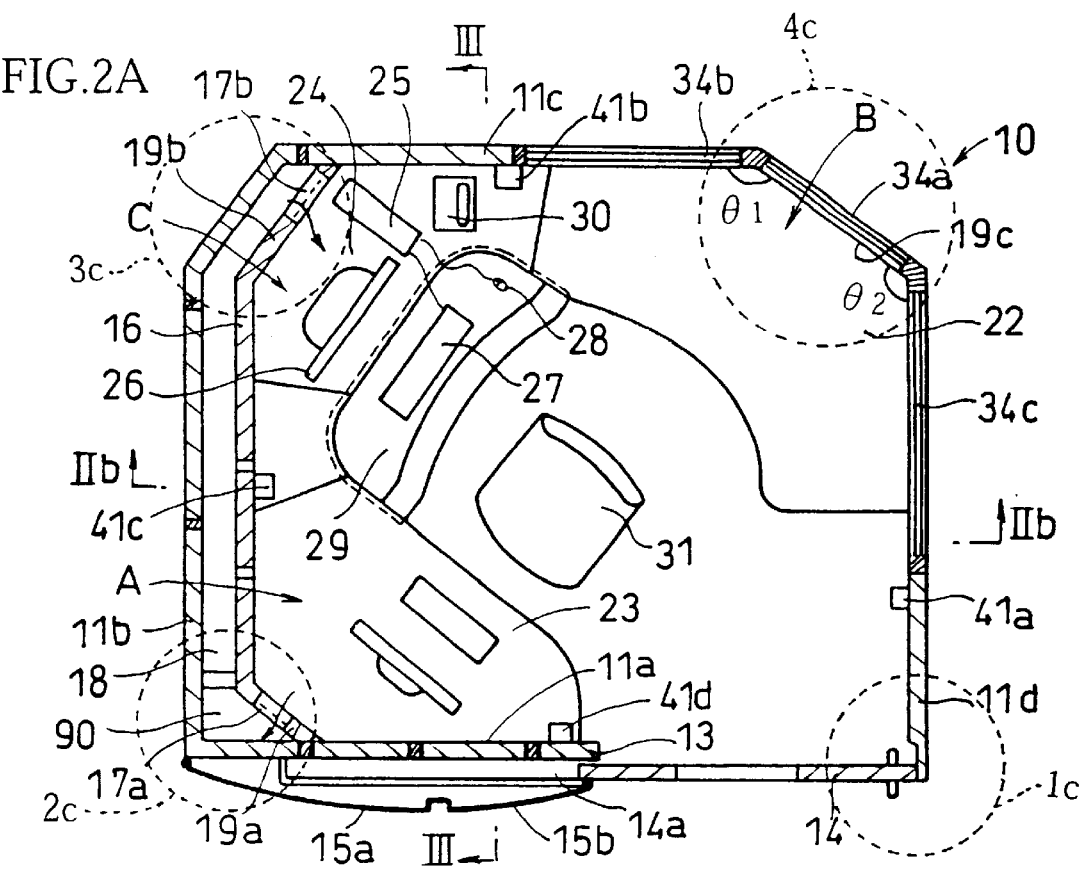
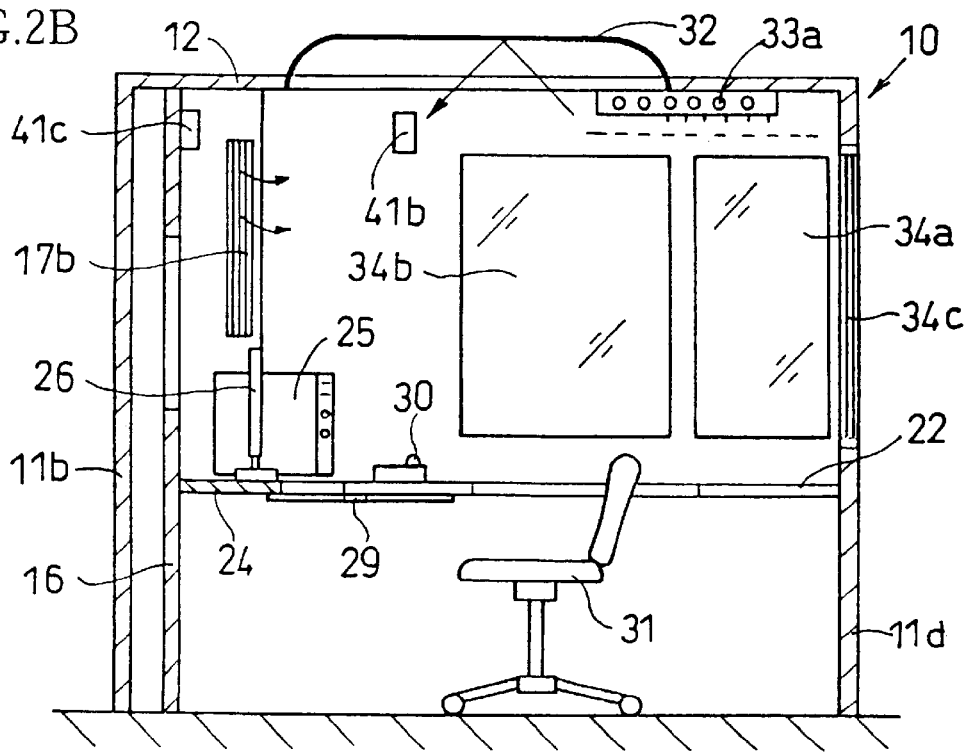

FIG.23
(Scene No.3)
Your Handedness
(If two-handed, select the more dominent one in work.)
 Right-handed
 Left-handed
Next ▶
Previous ◀
FIG.24
(Scene No.4)
Click on your favorite fragrance for work.
▼ Orange
  Lemon
  Bergamot
  Grapefruit
  Petitgrain
Click on your favorite fragrance for rest.
▼ Chamomile
  Japanese cypress
  Frankincense
  Vetiver
  Lavender
Next ▶
Previous ◀

FIG.25

(Scene No.5)

Insert:

"3-minute Relax"    into CDROM Drive 1
   "Sounds of Waves" into CDROM Drive 2
   "Smart CD"         into CDROM Drive 3

Next ▶
Previous ◀

FIG.26

(Scene No.6)

CD Title (Japanese/English)

Drive 4 [  X  ] (Natural Sounds)    [Japanese Title Input] [English Title Input]

Drive 5 [  Y  ] (Music)

Next ▶
Previous ◀

FIG.27
(Scene No.7)
You will take two brief tests for setting sound conditions.
It will take about 5 minutes.
Next 
Previous 
Skip  (If you select this menu,
default settings will start.)
FIG.28
(Scene No.8)
Please relax before starting the game.
Start 

FIG.29
(Scene No.9)
You will take two brief tests for setting sound conditions.
It will take about 5 minutes.
You will see two numbers in pair. Find out the sum,
and click on one of the numeric keys that corresponds to
the digit in the lowest place of the sum.
Start 
Previous Scene 
FIG.30
(Scene No.10)
5 ; 8
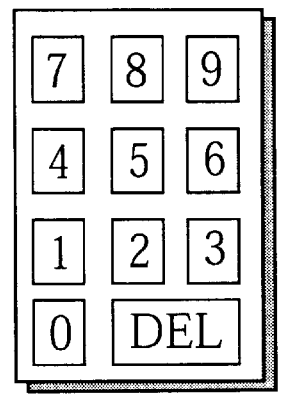

(Scene No.11)

You will see verious figures falling down.
Delete the one which is the same as the 'target'
by clicking on it.
The 'terget' will appear at the upper left corner
in the next scene (Scene No.12).

Start ▶
Previous Scene ◀

(Scene No.12)

△ (Target)

FIG.33

(Scene No.13)

Your personal environmental conditions have been set as follows:
ID; 5398
Eyesight; 1.0
Handedness; Left-handed

| | | |
|---|---|---|
| Work | Drive 4 (If not available, then Drive 2) | 60 dB |
| Rest | Drive 5 (If not available, then Drive 3) | 50 dB |
| | Drive 5 (If not available, then Drive 3) | 40 dB |
| | Drive 4 (If not available, then Drive 2) | 40 dB |

Fragrance for work   Orange
Fragrance for rest   Chamomile

End   ▶
Condition setting by   ▶
another CD

FIG.34

(Scene No.14)

Type in Registration Number   5398

Next   ▶
Previous   ◀

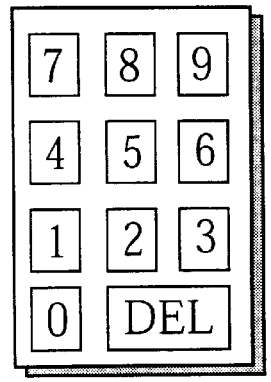

FIG.35

(Scene No.15)

Insert your favorite CDs into the drives for work and relaxation.

"3-minute Relax" into CDROM Drive 1
"Sounds of Waves" into CDROM Drive 2
"Smart CD" into CDROM Drive 3
▼ X into CDROM Drive 4
▼ Y into CDROM Drive 5

Next ▶
Previous ◀

FIG.36

(Scene No.16)

Click on your work category.

[Left-hemisphere work] Document making, calculation, etc.
[Right-hemisphere work] Planning, designing, etc.

Next ▶
Previous ◀

FIG.37

(Scene No.17)

Your work will continue for:

☐ hour(s)  ☐ minute(s)

Next ▶
Previous ◀

| 7 | 8 | 9 |
| 4 | 5 | 6 |
| 1 | 2 | 3 |
| 0 | DEL |

FIG.38

(Scene No.18)

Please relax before starting work.

[ Yes ]   [ No ]

WORKSPACE SYSTEM FOR IMPROVING PRODUCTIVENESS IN INTELLECTUAL ACTIVITIES

BACKGROUND OF THE INVENTION

1. Field of the Invention

The present invention relates to a workspace system designed for improving the productiveness in human intellectual activities. The present invention also relates to a controlling method and a controlling apparatus used for running such a workspace system. Further, the present invention relates to a storage medium to store programs for managing the workspace system.

2. Description of the Related Art

Recently, many offices are equipped with several high-tech tools such as personal computers, multi-functional facsimile machines or photocopiers. Accordingly, the working environment (privacy, lighting, etc.) of such working places needs to be reviewed in terms of human engineering, so that the workers will be able to efficiently cope with a number of demanding jobs in which dexterous handling of the high-tech tools is required.

In this connection, JP-B2-6(1994)-36772 for example teaches a workspace system wherein an office room is divided into smaller workspaces by partition walls in order to make a better working environment. With the use of such partitions, the privacy of each worker can be protected better. Being concealed behind the partitions, the workers may find it easier to concentrate on their jobs, and therefore the efficiency of work seems to improve. This expectation, however, often fails to be met for the following reason.

Generally, office workers may have various kinds of tasks to do. For instance, they may need to perform numerical calculations (left hemisphere-dominant work), draw designs (right hemisphere-dominant work), or do other miscellaneous chores (making a telephone call, managing data communications with others, etc.). In accordance with the arrangements of the above workspace system disclosed in JP-B2-6(1994)-36772, even such a multi-tasking worker is forced to hold substantially the same sitting posture for a long time, gazing in the same direction at his desk. Meanwhile, the worker may begin to feel tired as his brain becomes less stimulated in the invariant surroundings. As a result, the efficiency of work will disadvantageously decline.

One solution to overcome the above problem is proposed by JP-A-11(1999)-324364 for example. While disclosing that the human brain uses one hemisphere more dominantly than the other in dealing with a certain kind of task, JP-A-11(1999)-324364 teaches that the working efficiency can be improved by letting the worker listen to a particular kind of music (when he is engaged in a right hemisphere-dominant work) or by exposing him to white noise of a suitable intensity (when he is engaged in a left hemisphere-dominant work).

In addition, JP-A-11(1999)-324364 discloses a desk layout that allows the worker to selectively face in one of three directions, depending upon the task's nature (i.e., left hemisphere-dominant, right hemisphere-dominant or other).

Recent researches, however, have revealed that the improvement of the working efficiency depends upon not only the type of the work, but also the characteristics of the individual workers. Therefore, it may be of no use, or even may backfire, to provide all the workforce with a common acoustic stimulus or same posture-shifting freedom, without taking the individual workers' physical or mental characteristics into consideration.

SUMMARY OF THE INVENTION

The present invention has been proposed under the circumstances described above. It is, therefore, an object of the present invention to provide an improved workspace system for creating the optimum working environment that enables job performers to do their jobs more efficiently than is conventionally possible.

According to a first aspect of the present invention, a workspace system is provided.

Specifically, the work space system includes: a working region including a first environment suitable for a right hemisphere-dominant job, a second environment suitable for a left hemisphere-dominant job, a third environment different from the first and the second environments, and a seating area in which a job performer takes a seat; a first desktop for the first environment; a second desktop for the second environment; and a third desktop for the third environment. The first, the second and the third environments are disposed about the seating area. Also, the first, the second and the third desktops are different in nature from each other.

With the above arrangements, since the respective desktops are different in nature, the job performer can perceive different stimuli from them, depending upon which desktop he or she uses to do work. Thus, the right and the left hemispheres of the job performer are favorably activated, thereby dealing with the allotted jobs more efficiently than ever.

Preferably, the first, the second and the third desktops are different from each other in at least one of feel, material, shape and color.

The third desktop may be arranged between the first and the second desktops, though other layouts are also possible.

The workspace system may further include a chair placed in the seating area.

Preferably, the seating area may be located at the center of the working region. In this manner, there may be large room in the working area, so that the job performer does not feel confined.

Preferably, the workspace system may further include an optimum environment data generating system for providing the job performer with different stimuli in accordance with the respective environments.

With the above arrangements, it becomes easier to shut out external noises. Preferably, the workspace system may further include a booth that accommodates the working region. The booth may be formed with a doorway for easy access to the working region.

According to a second aspect of the present invention, there is a workspace system that includes: a working region including a first environment suitable for a right hemisphere-dominant job, a second environment suitable for a left hemisphere-dominant job, a third environment different from the first and the second environments, and a seating area in which a job performer shifts in position; a plurality of walls that define a booth accommodating the working region; a first desktop for the first desktop; a second desktop for the second environment; a third desktop for the third environment; and a doorway formed in the booth for causing the seating area to communicate with an outside of the booth. The first, the second and the third environments are arranged about the seating area.

Preferably, the first, the second and the third desktops are arranged in a series to make close contact one after another, and wherein two of the first, the second and the third desktops are separate from each other across the seating area as viewed from the doorway.

Preferably, the booth further includes a ceiling and a door for opening and closing the doorway.

Preferably, the workspace system may further include a lighting unit supported by the ceiling of the booth, and a light adjustor for adjusting brightness of the lighting unit.

Preferably, the booth may be provided with an optimum environment data generator for providing the job performer with different stimuli in accordance with the first, the second and the third environments.

Preferably, the above system may further include a controller that operates the optimum environment data generator based on personal data of the job performer. In this case, the following arrangements may be possible. Specifically, the controller determines work environment optimum values based on the personal data of the job performer. The optimum environment data generator operates based on the work environment optimum values. The work environment optimum values relate to sound, fragrance and illumination.

According to a third aspect of the present invention, there is provided a storage medium to store programs for a workspace system providing a first environment for a right hemisphere-dominant job and a second environment for a left hemisphere-dominant job. The programs include: an environmental condition setting program for determining environment optimum values corresponding to the first and the second environments, the determination being based on personal data of a job performer, the environment optimum values and the personal data in pair being written to a memory of the workspace system; and an environmental data generating program for reading out the environment optimum values, an environment data generator of the workspace system being operated based on the environment optimum values.

According to a fourth aspect of the present invention, there is provided a method of controlling a workspace system which utilizes an electronic data processing apparatus to provide at least a right hemisphere-dominant working environment and a left hemisphere-dominant working environment for a job performer in a work region. The method includes the steps of: inputting personal information of the job performer; determining optimum values for the respective working environments based on the personal information; and operating an environment data generator based on the determined optimum values.

According to a fifth aspect of the present invention, there is provided a controller for a workspace system which provides at least a right hemisphere-dominant working environment and a left hemisphere-dominant working environment for a job performer in a work region. The controller includes: an electronic data processing apparatus; a data input unit for inputting personal information of the job performer; an optimum value determiner for determining optimum values for the respective working environments based on the personal information; and an environment data generator that operates based on the determined optimum values.

Preferably, the environment data generator includes an adjusting apparatus that changes at least types of sound data, sound level, fragrance, and illuminance of a lighting system.

Other features and advantages of the present invention will become apparent from the detailed description given below with reference to the accompanying drawings.

BRIEF DESCRIPTION OF THE DRAWINGS

FIG. 2A is a sectional plan view showing the booth of FIG. 1;

FIG. 2B is a sectional view taken along lines IIb—IIb in FIG. 2A;

FIG. 23 illustrates Scene No. 3 to appear on a monitor used for the workspace system of the present invention;

FIG. 24 illustrates Scene No. 4 to appear on a monitor used for the workspace system of the present invention;

FIG. 25 illustrates Scene No. 5 to appear on a monitor used for the workspace system of the present invention;

FIG. 26 illustrates Scene No. 6 to appear on a monitor used for the workspace system of the present invention;

FIG. 27 illustrates Scene No. 7 to appear on a monitor used for the workspace system of the present invention;

FIG. 28 illustrates Scene No. 8 to appear on a monitor used for the workspace system of the present invention;

FIG. 29 illustrates Scene No. 9 to appear on a monitor used for the workspace system of the present invention;

FIG. 30 illustrates Scene No. 10 to appear on a monitor used for the workspace system of the present invention;

FIG. 33 illustrates Scene No. 13 to appear on a monitor used for the workspace system of the present invention;

FIG. 34 illustrates Scene No. 14 to appear on a monitor used for the workspace system of the present invention;

FIG. 35 illustrates Scene No. 15 to appear on a monitor used for the workspace system of the present invention;

FIG. 36 illustrates Scene No. 16 to appear on a monitor used for the workspace system of the present invention;

FIG. 37 illustrates Scene No. 17 to appear on a monitor used for the workspace system of the present invention;

FIG. 38 illustrates Scene No. 19 to appear on a monitor used for the workspace system of the present invention;

DETAILED DESCRIPTION OF THE PREFERRED EMBODIMENT

Figure 1:
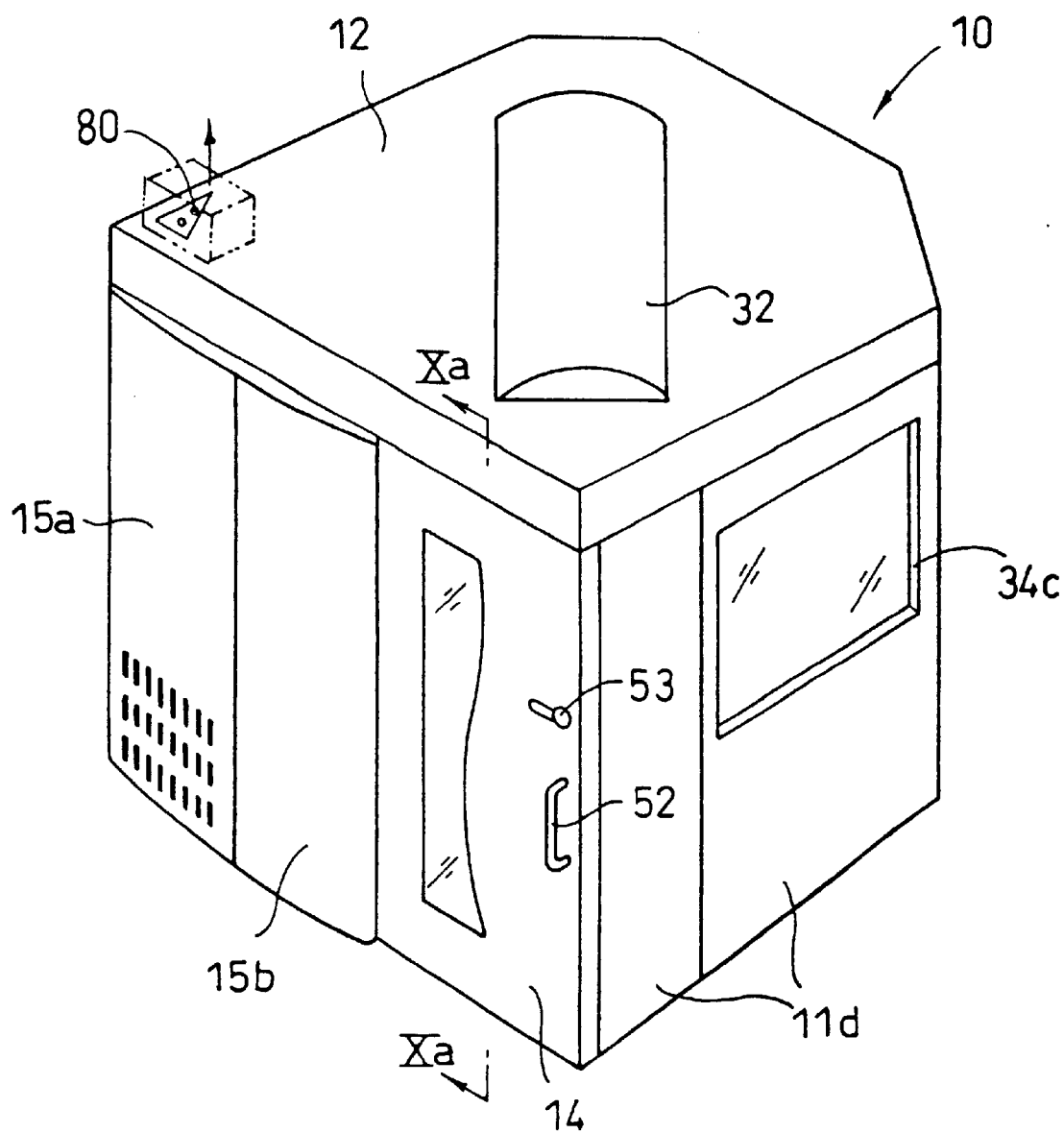
FIG. 1 is a perspective view showing a booth used for a workspace system according to a first embodiment of the present invention.

The preferred embodiments of the present invention will be described below with reference to the accompanying drawings.

FIGS. 1–13 illustrate a workspace system according to a first embodiment of the present invention. To better understand the system of the present invention, it is worth mentioning the following facts.

As disclosed in JP-A-11(1999)-324364, intellectual performance is closely related to some particular region of the brain. Specifically, the left hemisphere of the brain is superior in analytical functioning (the use of language for instance), while the right hemisphere is superior in visual and spatial performance.

For improving the efficiency of intellectual performance, disturbing sounds should be shut off. Due to the functional differences between the right and the left hemispheres, the noise-shielding schemes take different forms. Specifically, when a right hemisphere-dominant job (e.g. figure drawing) is being performed, it is necessary to shut off noise perceived dominantly by the right hemisphere (an example of such noise is traffic noise). To this end, it is good to play music having a certain rhythm. After the right hemisphere-dominant job is over, preferably the job performer may see a video clip which features stress-relieving scenes (e.g. leaves swaying in the wind) so as to relax the right hemisphere.

On the other hand, when a left hemisphere-dominant job (e.g. numerical calculations) is being performed, noises perceived dominantly by the left hemisphere (whispered talk for example) should be shut off. To this end, white noise may be generated against the disturbing talk. After the left hemisphere-dominant job is over, the job performer is supposed to listen to music (having a suitable rhythm) for relaxation of the left hemisphere.

As noted above, it is possible to shut off disturbing noises by playing music or by generating white noise. This is, however, a rather passive way to improve the work efficiency in a sense that an adverse effect distracting the worker's concentration is merely removed. It is more desirable if the work efficiency can be improved in a more active way.

Recent researches have shown that particular kinds of sounds are helpful to increase the work efficiency actively. Specifically, when the job performer is engaged in left hemisphere-dominant work, it is found good to generate right hemisphere-dominant sounds (e.g. natural sound such as a murmur of a little stream or sound of waves in the sea) within the hearing range of the job performer. When the job performer is engaged in right hemisphere-dominant work, on the other hand, left hemisphere-dominant sounds (e.g. music) are good for the work efficiency improvement. In either case, preferably the sound level of the disturbing noise is no greater than 30 dB (decibel).

In addition to the above, it has been found that stimuli resulting from the feel or shape or color of a desktop (work surface) affect the function of the brain, and that an appropriate fragrance helps to improve the efficiency of the work. Preferably, the job performer should take a break occasionally. During the break, it is good to supply the job performer with an acoustic stimulus under a dim condition, so that the recovery from fatigue is facilitated.

Figure 3:
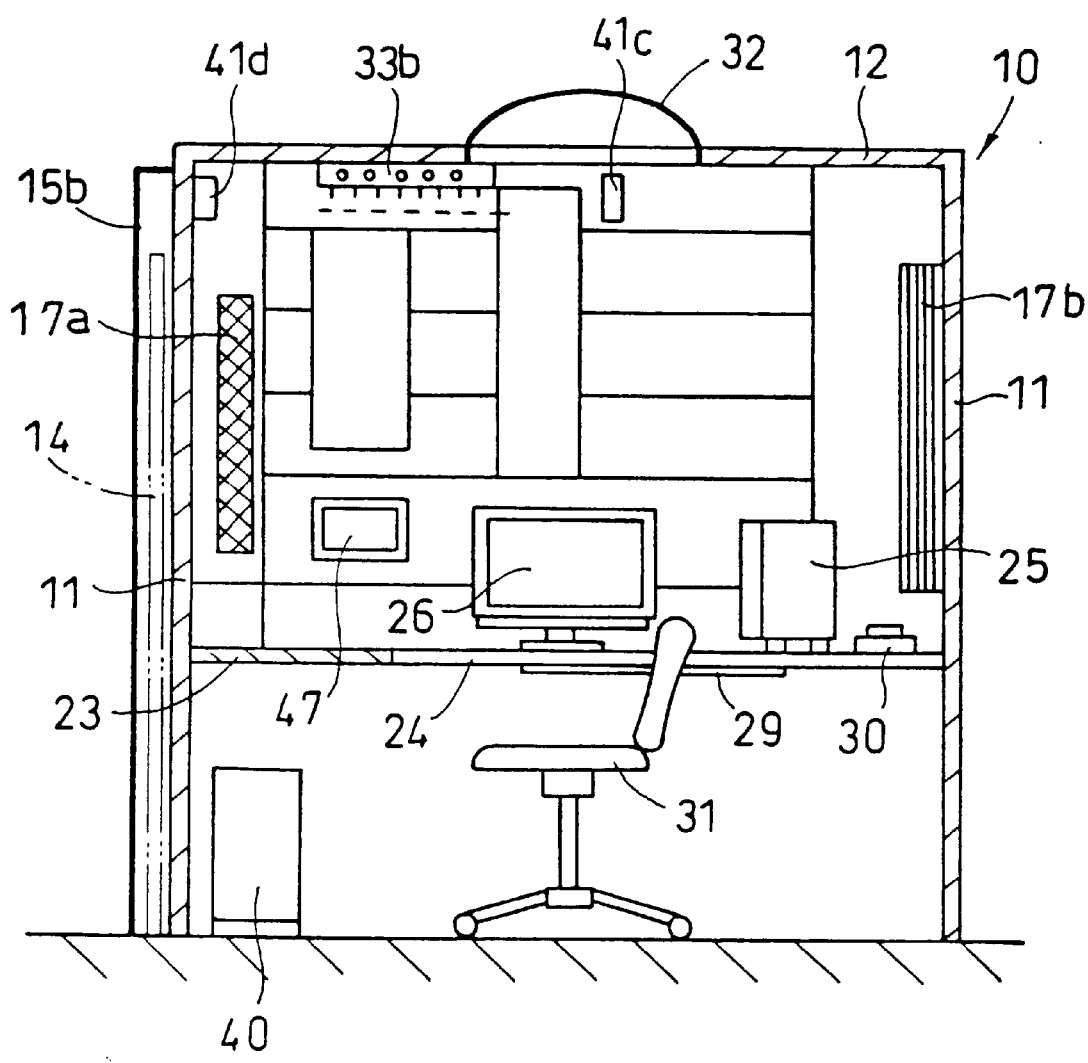
FIG. 3 is a sectional view taken along lines III in FIG. 2A.

Reference is now made to FIGS. 1–3 to describe the details of the workspace system of the first embodiment. As illustrated, the workspace system includes an enclosed compartment or booth 10 provided with a slidable door 14 for selectively closing a doorway 13 (see FIG. 2A). In the plan view of FIG. 2A, the booth 10 has a generally hexagonal contour. As viewed clockwise, starting from the doorway 13, the booth 10 includes a first wall 11a, a second wall 11b, a third wall 11c and a fourth wall 11d. At its top, the booth 10 is boarded with a ceiling 12.

In addition to the above four walls 11a–11d, the booth 10 includes an inner wall 16 (see FIGS. 2A–2B) disposed generally in parallel to the second wall 11b. The inner wall 16, as seen from FIG. 2A, consists of three sections: a relatively large central section, a first end section 19a and a second end section 19b. The first end section 19a is connected to the central section at an obtuse angle (about 130° for example). On the opposite side, the second end section 19b is connected to the central section at an obtuse angle (about 145° for example). The inner wall 16 is spaced from the second wall 11b by a predetermined distance to provide an air circulation passage 18.

As shown in FIG. 2A (see also FIG. 5), the third wall 11c is linked to the fourth wall 11d by an intermediary wall 19c. As illustrated, the third wall 11c and the fourth wall 11d intersect with the intermediary wall 19c at obtuse angles θ1 and θ2 respectively.

In the above embodiment, the angle θ1 is greater than the other angle θ2, though this is not limitative. Further, the intermediary wall 19c and the above-mentioned sections 19a–19b of the inner wall 16 are not necessarily flat, but may be curved (outwardly convex).

For shutting off external disturbing noises, the booth 10 is soundproofed. For example, the floor of the booth 10 is covered with a carpet, while the walls 11a–11d and the ceiling 12 are internally provided with a sound-absorbing material (e.g. rock wool). In the embodiment, though not shown in the figures, the respective walls (11a–11d) and the ceiling 12 each include two outer plates for holding the sound-absorbing material therebetween. Preferably, the outer plates may be made of steel, gypsum, synthetic resin, etc. Further, the doorway 13 can be closed by the sliding door 14 in a soundproofing manner. For instance, when the door 14 is brought into a close position (as shown in FIG. 2A), the door 14 is held in hermetic contact with the anterior end portion of the fourth wall 11d and with the first wall 11a.

Other soundproofing measures taken in the embodiment will be described in detail later with reference to FIGS. 9–12.

As seen from FIG. 2A, a door case 14a is disposed adjacent to the doorway 13 for accommodating the door 14 when opened. On the outside of the door case 14a, there are provided maintenance doors 15a–15b (see also FIGS. 1, 4–6A) to conceal the door case 14a. Each of the maintenance doors 15a, 15b may be set on a vertical hinge, so that it can be swung open.

In the booth 10, a sufficiently large seating area is provided for accommodating a chair 31 in a manner allowing the chair 31 to move freely. Upon entering the booth 10 via the doorway 13, the job performer finds himself or herself to be in the seating area.

As seen from FIG. 2A, the seating area extends diagonally in the booth 10. Precisely, the booth 10 has four corners: a first corner 1c at which the door 14 and the fourth wall 11d meet, a second corner 2c at which the first wall 11a and the second wall 11b (or the inner wall 16) meet, a third corner 3c at which the second wall 11b (or the inner wall 16) and the third wall 11c meet, and a fourth corner 4c at which the intermediary wall 19c is disposed. The seating area extends from the first corner 1c toward the third corner 3c until it terminates at the front edge of the third desktop 24 (or the front edge of an auxiliary desktop 29 if such is provided).

As shown in FIG. 2A, the workspace system of the present embodiment includes three (first to third) different working environments A, B and C. The first working environment A, which is adjacent to the doorway 13, is designed for optimizing the efficiency of "left hemisphere-dominant" jobs that are dealt with mainly by the left hemisphere. Examples of left hemisphere-dominant jobs are making a calculation and writing a composition.

The second working environment B, which is opposite to the first environment A across the seating area, is designed for optimizing the efficiency of "right hemisphere-dominant" jobs that are dealt with mainly by the right hemisphere. An example of the left hemisphere-dominant jobs is drawing figures, illustrations, etc.

The third working environment C, which is disposed between the first and the second environments A, B and located farthest away from the doorway 13 of the three working environments, is designed for optimizing the efficiency of data-organizing work, data-telecommunication work, etc. using personal computers, facsimile machines, etc.

In the illustrated embodiment, the booth 10 accommodates at least three (first to third) work surfaces (or desktops) upon which the job performer does work. The first desktop 23 is provided for the first environment A, the second desktop 22 for the second environment B, and the third desktop 24 for the third environment C. Sitting on the chair 31 placed in the seating area (see FIG. 2A), the job performer may face in a first direction (to the west for example) in doing work on the first desktop 23, or in a second direction (to the east) in doing work on the second desktop 22, or in a third direction (to the north) in doing work on the third desktop 24.

In the illustrated embodiment, the first, the second and the third desktops 23, 22, 24 are set at the same height. As shown in FIG. 2A, these three desktops are held in close contact with the inner walls of the booth 10. Further, the first desktop 23 is held in close contact with the third desktop 24 at one end (precisely, a segment 24a of the third desktop 24), while the second desktop 22 is held in close contact with the third desktop 24 at an opposite end. According to the present invention, alternatively, the three desktops may be spaced from each other by predetermined distances.

According to the present invention, the desktops 22–24 are made of different materials so that they exhibit different feel, different configuration or different color.

Specifically, the first desktop 23, at which a left hemisphere-dominant job is to be performed, is made of wood. Alternatively, the desktop 23 may include a steel plate whose top surface is covered by an ornamental sheet presenting wood-grain appearance. Preferably, the color of the desktop 23 is warm one (red, orange, yellow, brown, etc.), and the surface of the desktop 23 feels smooth. As shown in FIG. 3, below the first desktop 23, an environment setting controller 40 is disposed.

Preferably, the inner surfaces of the booth 10 are also rendered different in feel, configuration or color. Specifically, the inner surface of the first wall 11a suitable for the left hemisphere-dominant work is flat and smooth. No projections should be attached to the inner surface. (Thus, the inner surface is not provided with a shelf, a box, etc.) The color of the inner surface is cool or cold one (white, beige, etc.). To provide such features, the first wall 11a may be made of a metallic material (steel plate for example) whose inner surface is applied with a paint or covered by a wall paper. The paint should not make any pattern on the inner surface. The wall paper should be a plain one upon which no pattern is made.

The second desktop 22, at which a right hemisphere-dominant job is to be performed, is made of natural wood exhibiting grains with many knots exposed in the surface. The second desktop 22 feels rather rough than smooth, and is bright in color.

The inner surface of the fourth wall 11d suitable for the right hemisphere-dominant work is warm in color. Examples of such color are red, yellow, reddish yellow, moderate reddish brown (walnut), brown, rosewood, etc. The forth wall 11d may be made of a steel or wood plate whose inner surface is covered by cloth or ornamental sheet with a pattern of grains.

The third desktop 24 may be used for organizing data, transmitting data to external sections, or receiving data from the external sections. To this end, the third desktop 24 is provided with a personal computer and a telecommunications device 30 such as a telephone or a facsimile machine. Preferably, the third desktop 24 exhibits cold appearance and smooth touch. The third desktop 24 may be made of a steel plate whose upper surface is covered by a cold-colored ornamental sheet. In the illustrated embodiment, the third desktop 24 includes a stone segment 24a whose surface is smooth like highly polished marble.

As noted above, the three desktops 22–24 are different in material, feel, color, shape, etc. Thus, the job performer will perceive different tactile or visual sensations depending upon which desktop the job performer is touching or looking at. As a result, the right or left hemisphere will receive different stimuli serving to improve the efficiency of the work.

The third desktop 24 may carry an information processor 25 (e.g. main unit of a personal computer) and a display 26 (cathode ray tube type or liquid crystal type). In such an instance, preferably, an auxiliary desktop 29 is provided for setting a keyboard 27 and a mouse 28. As shown in FIGS. 2A and 2B, the auxiliary desktop 29 may be disposed in front of the third desktop 24 and at a lower position. Preferably, the auxiliary desktop 29 is detachable from the third desktop 24 and can be attached to the first and the second desktops 22, 23. In this way, the job performer can comfortably use the computer system (including the display 26, the keyboard 17, etc.) at the first or second desktop.

In the illustrated embodiment, the first and the second desktops 22, 23 are so large that a server, a connector, an adaptor, a CD player, etc. can be snugly put away under the desktop 22 or 23. Further, since the seating area extends diagonally in the booth 10 (see FIG. 2A), the job performer in the seating area will find the working space of the booth 10 sufficiently large.

The chair 31 is a swivel chair, whereby the seat can be turned around a central point to face in a different direction without moving the legs. Preferably, each of the legs is provided with a caster for facilitating the movement of the chair 31 on the floor.

Figure 7:
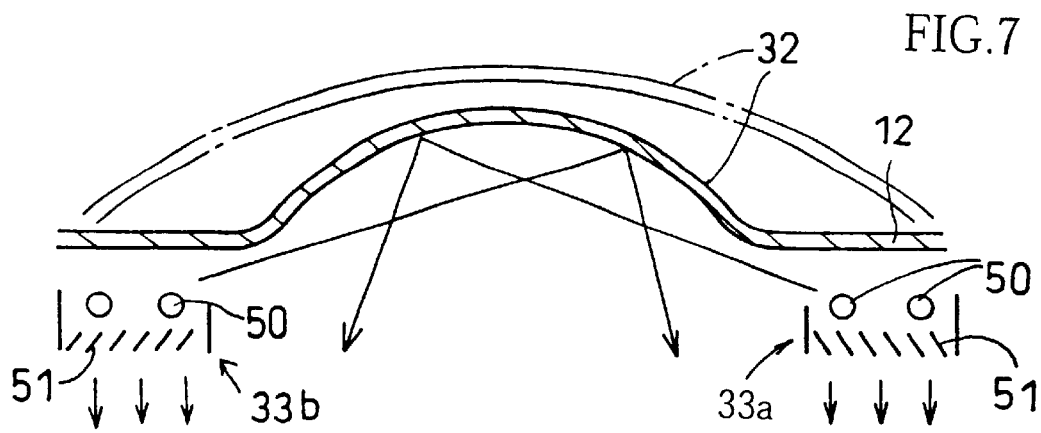
FIG. 7 is a sectional view showing the upper portion (ceiling) of the booth.

Referring to FIGS. 1, 2B, 3 and 7, the booth 10 is provided, on the upper surface of the ceiling 12, with a dome 32 which extends, in plan view, along the line connecting the first corner 1c and the third corner 3c (FIG. 2A). As best shown in FIG. 7, the dome 32 projects upward from the ceiling 12. In this manner, the job performer working under the dome 32 will feel no (or only slight) oppression from above.

On both sides of the dome 32, as shown in FIG. 7, first and second illuminators 33a, 33b are provided for direct and indirect lighting in the booth 10. The first illuminator 33a is located above the second desktop 22 (for right hemisphere-dominant jobs), extending generally from the second working environment B toward the third working environment C. The second illuminator 33b is located above the first desktop 23 (for left hemisphere-dominant jobs), extending generally from the first working environment A toward the third working environment C.

The first and the second illuminators 33a, 33b each include fluorescent lamps 50 and a reflector for limiting the passage of light emitted from the lamps 50. Preferably, the illuminance of the lamps 50 is variable. In the illustrated embodiment, the reflector includes a set of light-limiting bars or louvers 51 disposed under the lamps 50. The louvers 51 are rotatable about their longitudinal axes by remote control, thereby adjusting the amount of openings the downward light passes through. For instance, when no direct light is desired, the louvers 51 are brought into a horizontal position, thereby shutting off the downward light completely. On the other hand, when the direct light is to be maximized, the louvers 51 are brought into a vertical position, so that the widest openings appear under the lamps 50. In place of the louvers 51, use may be made of a plate formed with light-passing through-holes adjustable in diameter.

When the louvers 51 are held in an intermediate position as shown in FIG. 7, the downward light from the fluorescent lamps 50 partly reflects on the louvers 51, while partly passing through the openings without being reflected on the louvers 51 to provide direct illumination. On the other hand, indirect illumination is obtained as follows. After being reflected on the louvers 51, the light will strike on the other parts of the reflector or on the ceiling 12, to be reflected further. Thereafter, the light may be directed downward (indirect illumination) or toward the inner surface of the dome 32. As shown in FIG. 7, upon striking on the dome 32, the light may be directed downward (indirect illumination). Advantageously, the combination of the direct light (strong) and the indirect light (gentle) provides a bright but non-eye-straining working environment.

According to the illustrated embodiment, the first illuminator 33a is designed to emit "warm" light (resulting from relatively low color temperature) which is red- or yellow-dominant light. As basking in such warm light, the job performer will be able to perform right hemisphere-dominant work more efficiently. Likewise, the second illuminator 33b is designed to emit "cold" light (resulting from relatively high color temperature) which is white-dominant light. The cold light is advantageous to improving the efficiency of left hemisphere-dominant work.

The third desktop 24 is illuminated by the combination of the warm indirect light from the first illuminator 33a and the cold indirect light from the second illuminator 33b. The illumination blend of the warm light and the cold light serves to improve the efficiency of the data-managing or data-processing jobs performed at the third desktop 24.

According to the present invention, as shown by single-dot chain lines in FIG. 7, the dome 32 is rendered large enough to overlap the first and the second illuminators 33a, 33b. In this manner, the light emitted from the illuminators 33a, 33b will be directed downward more properly.

Figure 8:
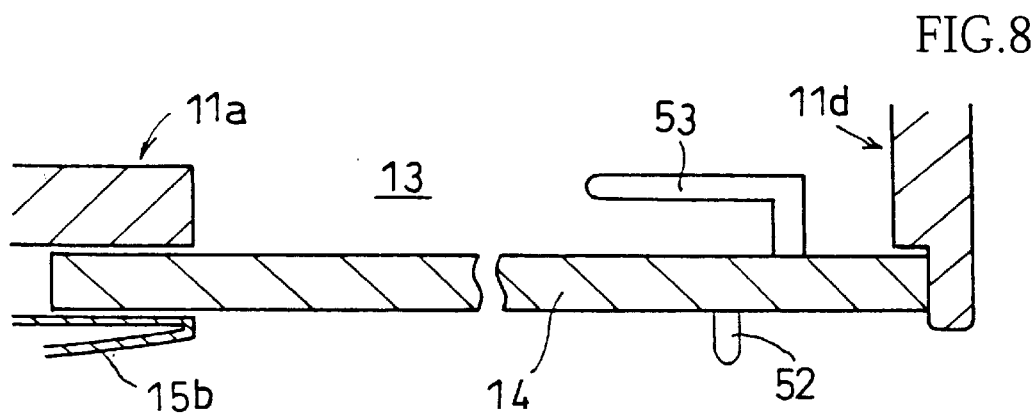
FIG. 8 is a sectional view showing a part of a door used for the booth.
Figure 9:
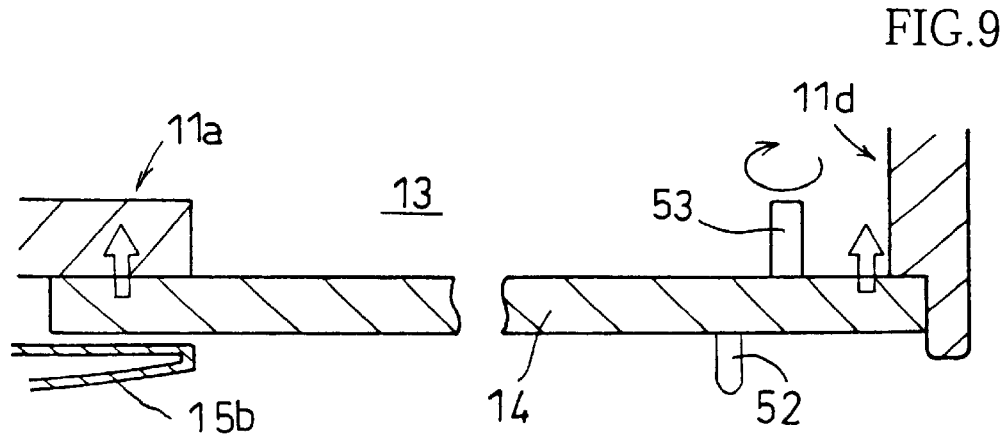
FIG. 9 is a sectional view showing the door in a hermetically closed state.
Figure 10:
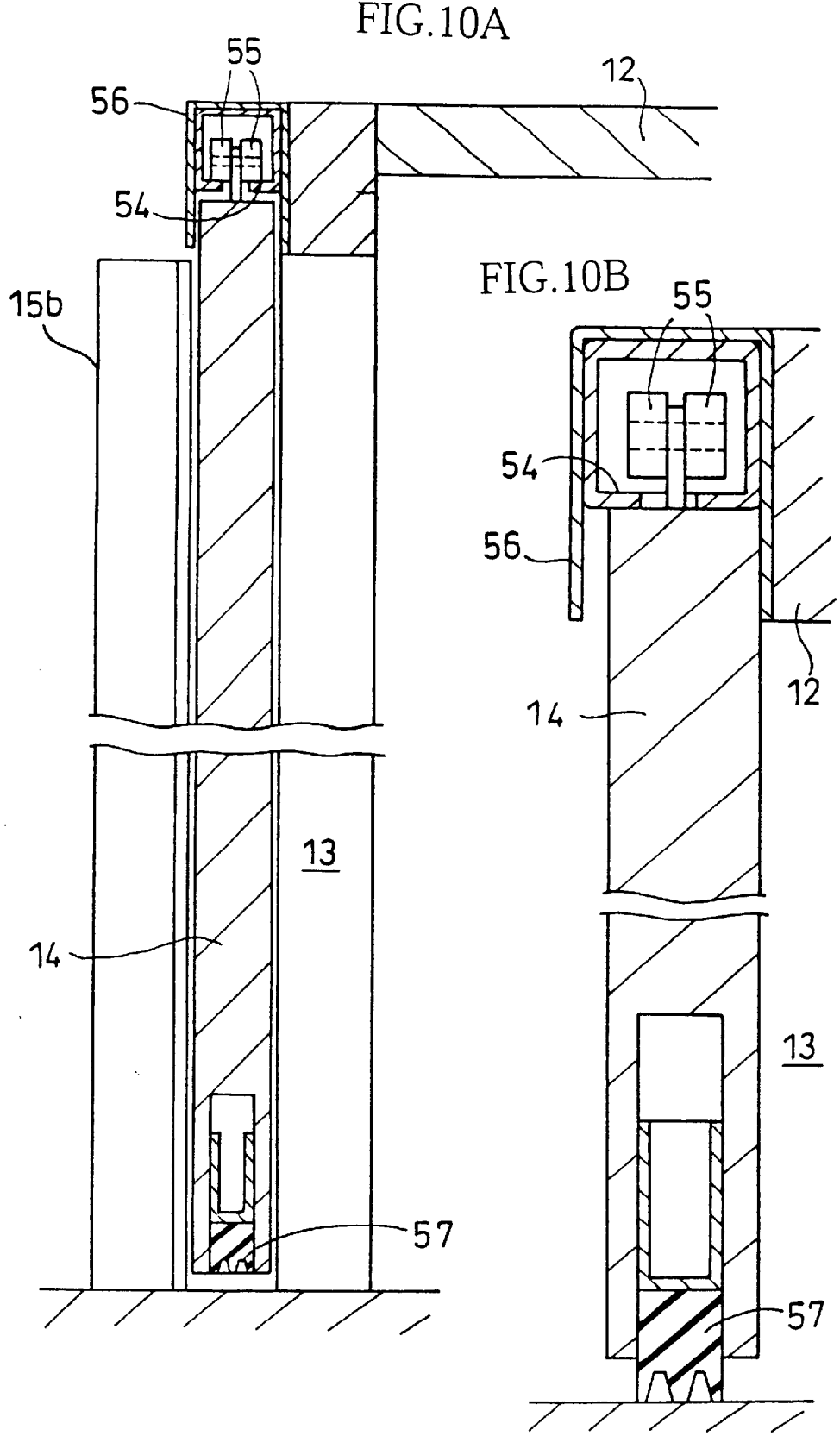
FIG. 10A is a sectional view taken along lines Xa—Xa in FIG. 1.
FIG. 10B is a vertical sectional view showing the door in a hermetically closed state.

The door 14 may be made of a steel plate sandwiched between an outer and an inner gypsum boards for the purposes of soundproofing. Referring to FIGS. 1 and 8–9, the door 14 is provided, on its outer side, with a handle 52 to be grasped in opening or closing the door 14. Beside the handle 52, the door 14 is provided with a lock handle 53 which is operable from outside and inside of the booth 10.

The door 14 is slidably suspended. As shown in FIG. 10A, the booth 10 is provided with a rail 54 having a generally C-shaped cross section for engagement with rollers 55 attached to the upper edge of the door 14. The rail 54 is disposed slightly above the doorway 13 and is accommodated in a frame 56.

The door 14 is provided, along its lower edge, with a sealing member 57 which is moved vertically. As shown in FIG. 10A, normally the sealing member 57 is spaced from the floor. When the door 14 is closed, the sealing member 57 is lowered to come into hermetic contact with the floor, as described below.

Specifically, when the lock handle 53 is turned, with the door 14 held in the close position (as shown in FIG. 1), the door 14 is brought into hermetic contact with the first wall 11a and the fourth wall 11d, as shown in FIGS. 9 and 10B. At the same time, the sealing member 57 is lowered to come into hermetic contact with the floor. The amount of the downward displacement of the sealing member 57 relative to the door 14 is set to be large enough to raise the door 14 slightly above the floor, thereby causing the upper edge of the door 14 to come into contact with the rail 54. In this manner, the doorway 13 is hermetically closed by the door 14.

Figure 11:
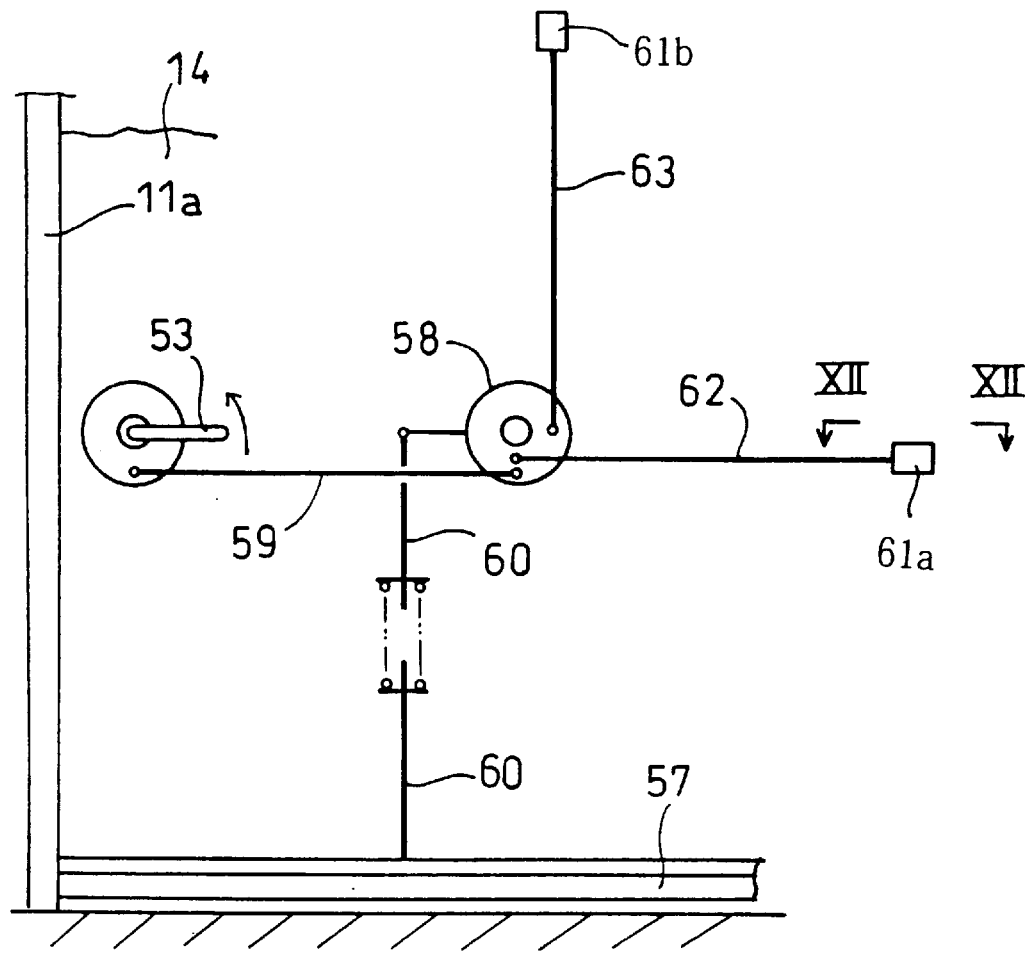
FIG. 11 schematically shows the basic structure of a actuation mechanism for opening or closing the door.
Figure 12:
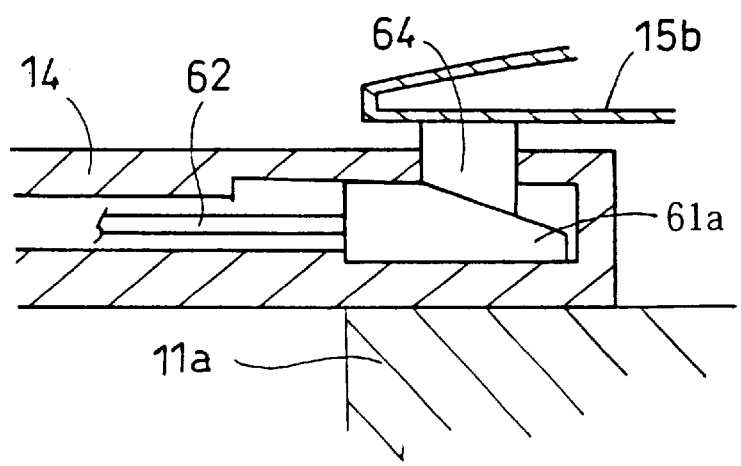
FIG. 12 is a sectional view taken along lines XII—XII in FIG. 11.

In the illustrated embodiment, the above-described hermetic closing of the door 14 is performed by a driving mechanism as shown in FIGS. 11 and 12. Specifically, as best shown in FIG. 11, the driving mechanism includes a first disk (connected to the lock handle 53), a second disk 58 (rotatable about a fixed axis), a connection bar 59 (linking the first and the second disks), and first to third driving rods 60, 62, 63. The first driving rod 60 is linked to the second disk 58 at its upper end and connected to the sealing member 57 at its lower end. The second driving rod 62 is connected to the second disk 58 at one end and carries a first wedge 61a (see FIG. 12) at the other end. The third driving rod 63 is connected to the second disk 58 at its lower end and carries a second wedge 61b at its upper end. As seen from FIG. 12, the driving mechanism is accommodated in a space within the door 14.

With the above structure, when the lock handle 53 is operated as shown in FIG. 11, the second disk 58 is rotated via the connection bar 59. As a result, the sealing member 57 is lowered by the first driving rod 60, the first wedge 61a is moved to the right, and the second wedge 61b is moved upward.

Referring to FIG. 12, when the first wedge 61a is moved to the right, a presser member 64 (held in sliding contact with the wedge 61a) is brought into pressing contact with the maintenance door 15b. Upon this, the presser member 64 pushes back the wedge 61a, thereby bringing the door 14 into contact with the first wall 11a. Likewise, the upward movement of the second wedge 61b causes anon-illustrated presser member to come into pressing contact with the door rail frame 56 (see FIG. 10B). Thus, the door 14 as a whole is brought into hermetic contact with the fourth wall 11d.

Referring now to FIGS. 1, 2A–2B, the booth 10 is provided with three windows adjacent to the second working environment B, which is for the right hemisphere-dominant jobs. The intermediary wall 19c is provided with a first window 34a, the third wall 11c is provided with a second window 34b, and the fourth wall 11d is provided with a third window 34c. The panes of these windows are irremovably fixed to the walls 19c, 11c and 11d. Through the respective windows 34a–34c, the job performer, as sitting at the desktop 22, can enjoy a wide view outside of the booth 10. This prevents the job performer from feeling confined in a small space.

Preferably, for enhancing the soundproofing effect, each window includes two parallel panes spaced by a predetermined distance. To control privacy, use may be made of a screen for each window. The screen may be hung on a wall surface inside of the booth 10, or be arranged between the above-mentioned windowpanes. In either case, the screen may be uncovered from the windowpane, as required. Examples of such a screen are a Venetian blind, a shutter, or a non-transparent (translucent or opaque) glass plate.

Figure 13:
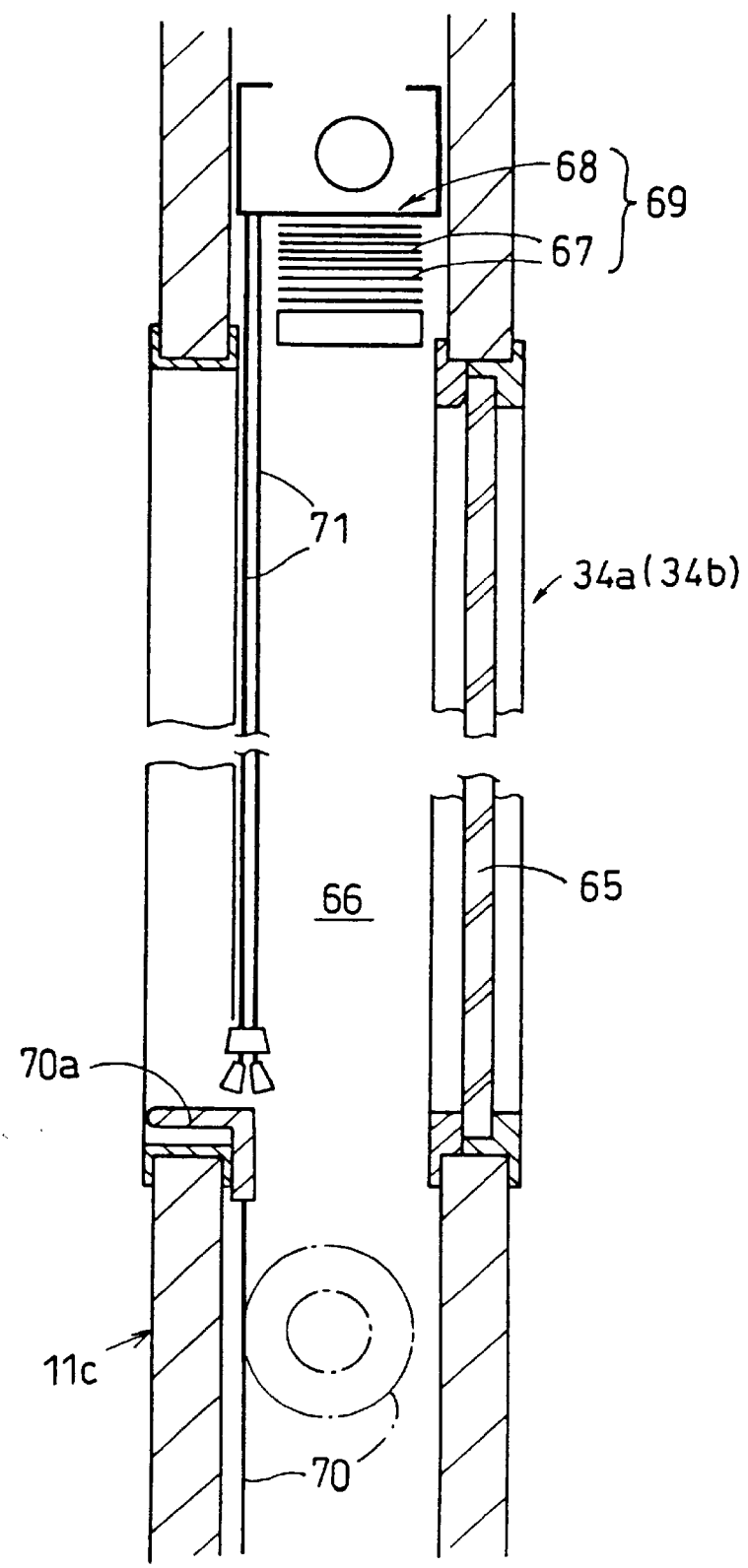
FIG. 13 is a sectional view taken along lines XIII—XIII in FIG. 5.

Reference is now made to FIG. 13 showing, in section, the basic structure of the first window 34a embedded in the third wall 11c. The sectional view is taken along lines XIII—XIII in FIG. 5. In FIG. 13, the outside of the booth 10 is to the right of the wall 11c, while the inside of the booth 10 is to the left of the wall 11c. For providing the window 34a, the wall 11c is formed with a space 66. The window 34a includes a pane 65 arranged on the outside of the space 66. In the space 66, a Venetian blind 69 and a screen 70 are provided.

The Venetian blind 69 includes a number of slats 67, a headbox 68 and a lift cord 71. By operating the lift cord 71, it is possible to pull up or down the slats 67, and also to cause the slats to be pivoted to control the amount of light that passes through.

The screen 70 maybe a flat, non-flexible sheet (shown in solid lines in FIG. 13) or flexible sheet that can be wound up as a roll (shown in single-dot chain lines). The screen 70 is provided, at its upper end, with a pull-up tab 70a. By moving the tab 70a vertically, the screen 70 can be pulled up or down. Preferably, the screen 70 may be a "one-way" shade which can be seen through only from inside of the booth 10, but not from the outside of the booth 10.

Figure 4:
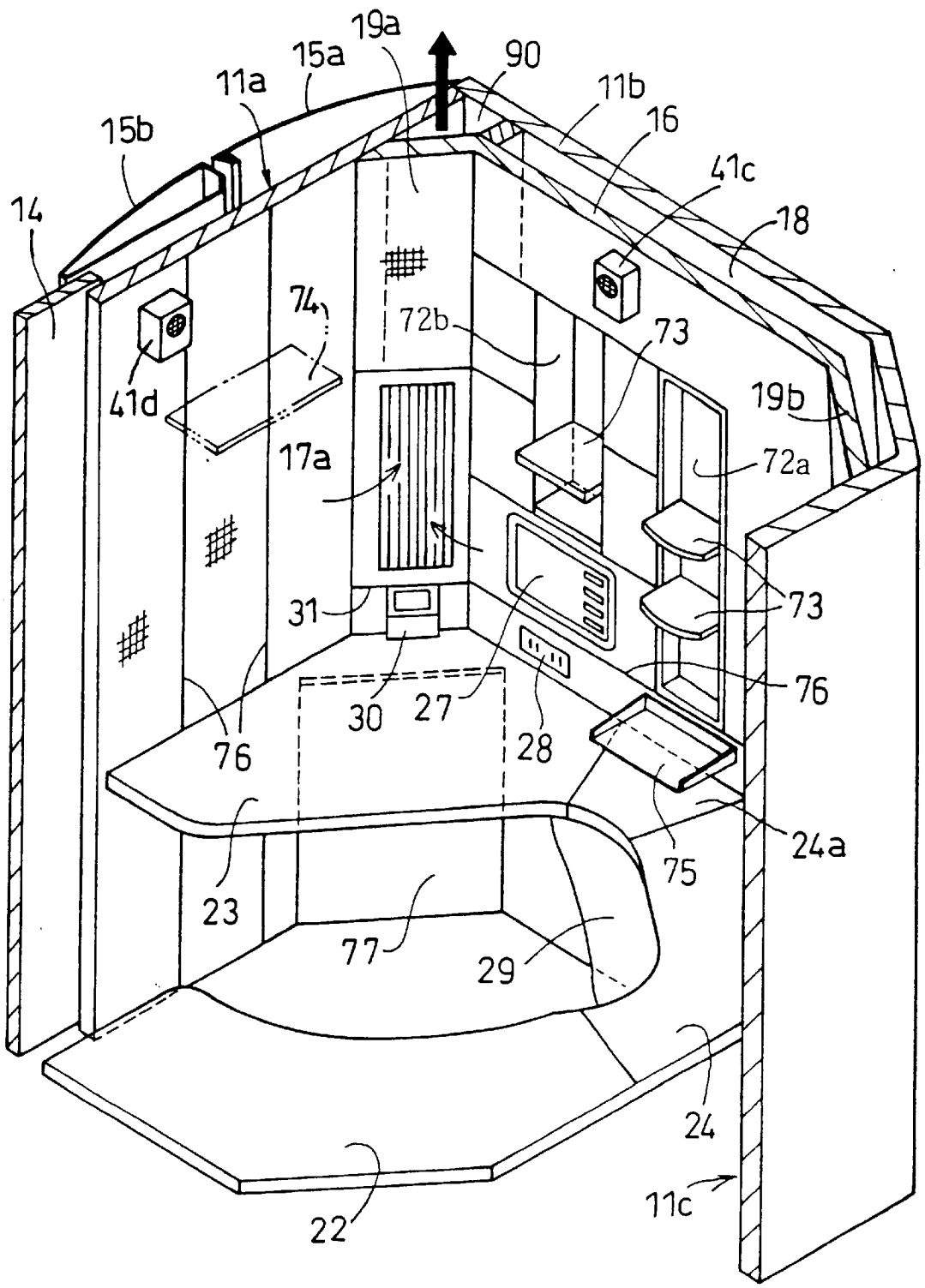
FIG. 4 illustrates a part of the inside of the booth.

Referring to FIG. 4, a shallow recess 72a and a deep recess 72b are provided at the assembly of the second wall 11b and the inner wall 16. As illustrated, one or more shelves 73 may be detachably fixed in the recesses 72a, 72b for keeping things on the shelves.

As shown in FIG. 4, an additional shelf 74 may be fixed to the first wall 11a, and a stationery tray 75 is fixed to the second wall 11b. Preferably, the shelf 74 and the tray 75 are readily detachable. To this end, use may be made of suitable supporting or fixing means such as brackets (which may be provided on a wall of the booth 10) or catches (which may be provided on the tray 75 or the shelf 74). In the illustrated embodiment, the tray 75 is provided with a set of catches, while the inner wall 16 is formed with a fixing groove 76 into which the catches of the tray 75 are inserted for fixation.

Referring to FIGS. 2–5, the booth 10 is provided with four speakers 41a–41d to create suitable acoustic environments in which the job performer can concentrate on his or her work. As illustrated, a first speaker 41a is put on the fourth wall 11d, a second speaker 41b on the third wall 11c, a third speaker 41c on the inner wall 16, and a fourth speaker 41d on the first wall 11a.

In the illustrated embodiment, the following ventilation system is provided for keeping the air in the booth 10 clean.

Figure 5:
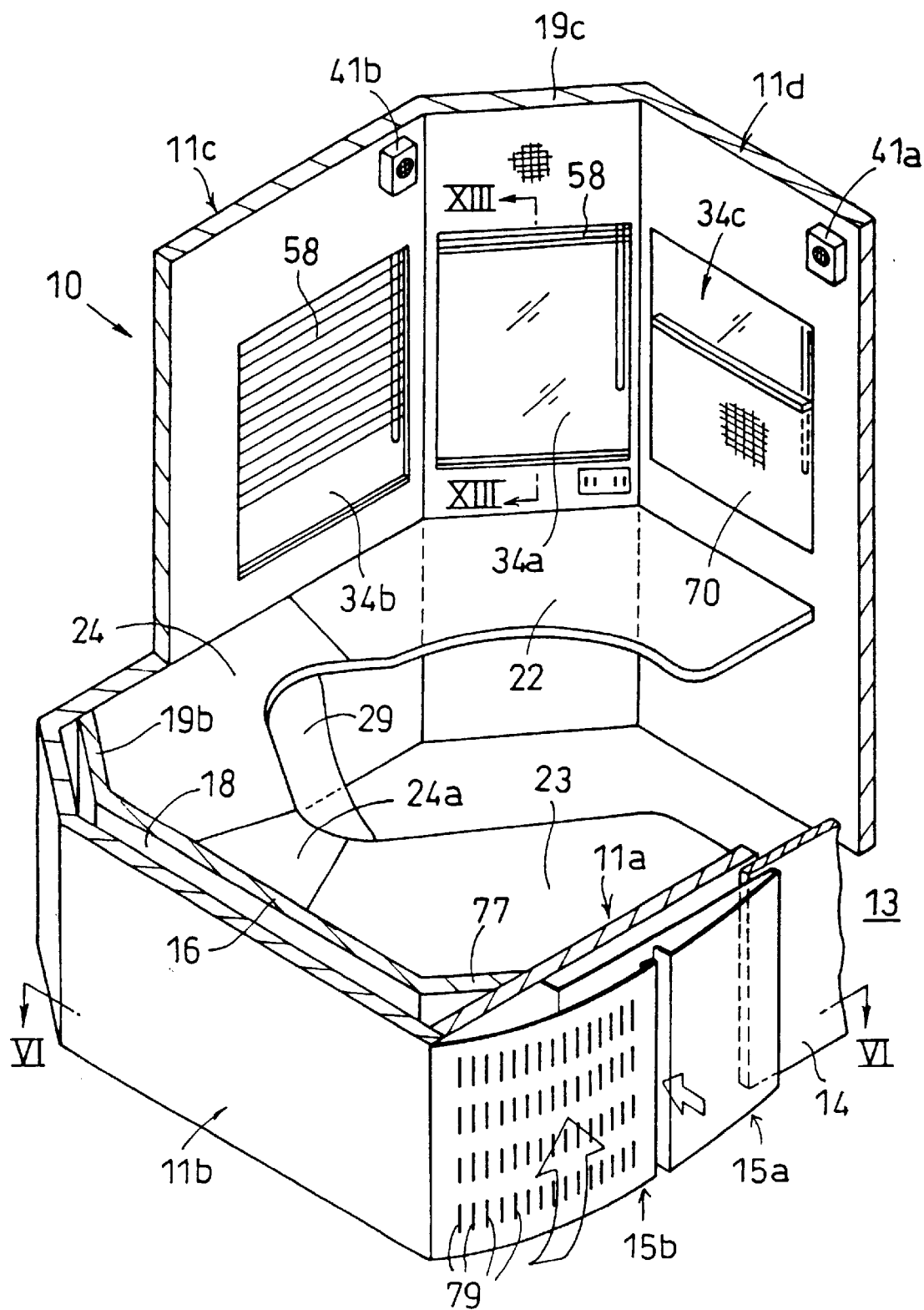
FIG. 5 illustrates another part of the inside of the booth.
Figure 6:
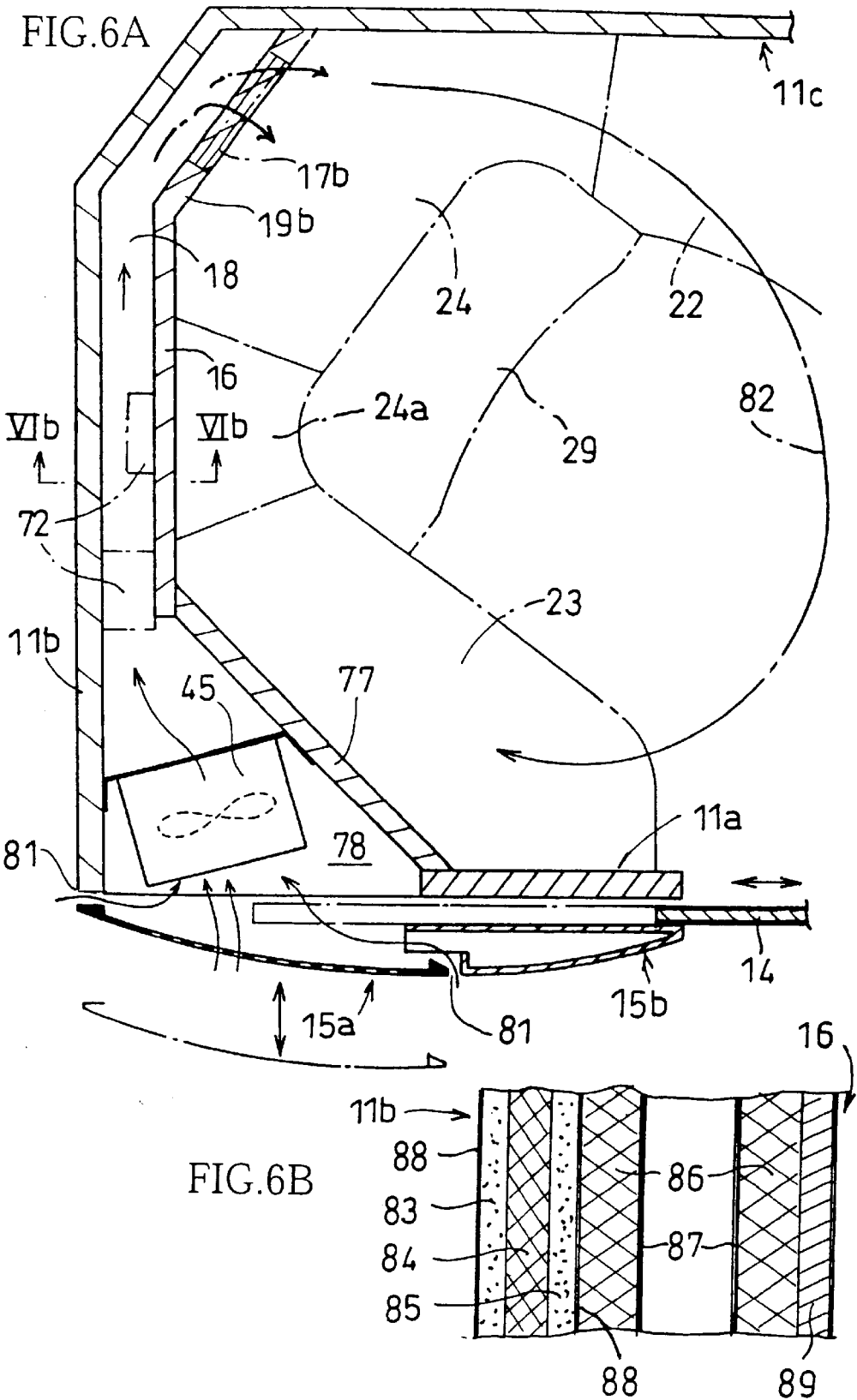
FIG. 6A is a sectional view taken along lines VI—VI in FIG. 5.
FIG. 6B is a sectional view taken along lines VIb—VIb in FIG. 6A.

Referring to FIG. 6A, the ventilation system includes an air-handling unit 45 incorporating an electric-powered fan. The unit 45 is located near the maintenance door 15a and between the second wall 11b and a panel 77. The panel 77 is connected to the first wall 11a and the inner wall 16, defining an air inlet space 78 in which the unit 45 is disposed. As shown in FIG. 5, the maintenance door 15b is formed with a plurality of openings 79 for introducing the outside air into the air inlet space 78. In addition, as shown in FIG. 6A, an air inlet gap 81 is provided between the two maintenance doors 15a and 15b, and another air inlet gap 81 is provided between the second wall 11b and the maintenance door 15a.

As shown in FIG. 4, the first end section 19a is provided with an air inlet 17a which communicates with the air circulation passage 18. As shown in FIG. 6A, the second end section 19b is provided with an air outlet 17b which also communicates with the passage 18. When the air-handling unit 45 is turned on, the rotating fan of the unit 45 draws air into the passage 18 from the working space of the booth 10 via the air inlet 17a, and forces the air out of the passage 18 into the working space of the booth 10 via the air outlet 17b. As shown in FIG. 1, the ceiling 12 of the booth 10 is formed with an opening 80 communicating with the passage 18. Thus, part of the air taken into the passage 18 is let out from the booth 10 via the opening 80. This is advantageous to keeping the air in the booth clean and also preventing the temperature inside of the booth 10 from rising unduly. (Precisely, the opening 80 communicates with an exhaust passage 90 shown in FIG. 4.) Preferably, a ventilation fan may be provided adjacent to the opening 80 or in the exhaust passage 90 so that contaminated air inside the booth 10 is expelled more effectively. Together with the ventilation fan, an air cleaner (photocatalyst type, filter type, etc.) may be provided.

Preferably, the air inlet 17a and the air outlet 17b are provided with a set of louvers. As shown in FIG. 6A, the air blown out from the air outlet 17b is guided by the third wall 11c for awhile, and then flows along a path 82 (single-dot chain line) toward the air inlet 17a (see FIG. 4).

When the booth 10 is installed in an air-conditioned office space for example, no additional air conditioning is required for the booth 10 since cool or warm air can be taken into the booth 10 by the above-described ventilation system. However, when no such air conditioning is prepared (when the booth 10 is set up outdoors for instance), the booth 10 may be installed with an air-conditioning system of its own.

According to the present invention, a metal or resin duct may be used in place of or together with the air circulation passage 18. Such a duct may be embedded in a wall or simply put in a space between two facing walls for example.

As shown in FIG. 6B, the second wall 11b may be composed of a first gypsum board 83, a rock wool layer 84, a second gypsum board 85, a glass wool layer 86, glass cloth 87 and two metal layers 88 (made of SPCC or rolled zinc/steel plate). With such an arrangement, the second wall 11b is highly soundproof. The inner wall 16, composed of a panel 89 and a glass wool layer 86 covered by glass cloth 87, is also soundproof. The panel 89 may be made of a soft material so that paper sheets or the like can be easily pinned to the panel. Since the air circulation passage 18 and the air inlet space 78 are encloses by such soundproofing walls, it is possible to prevent or reduce the leakage of the sounds made by the air flow along the passage 18 or by the air-handling unit 45 in operation.

Figure 14A:
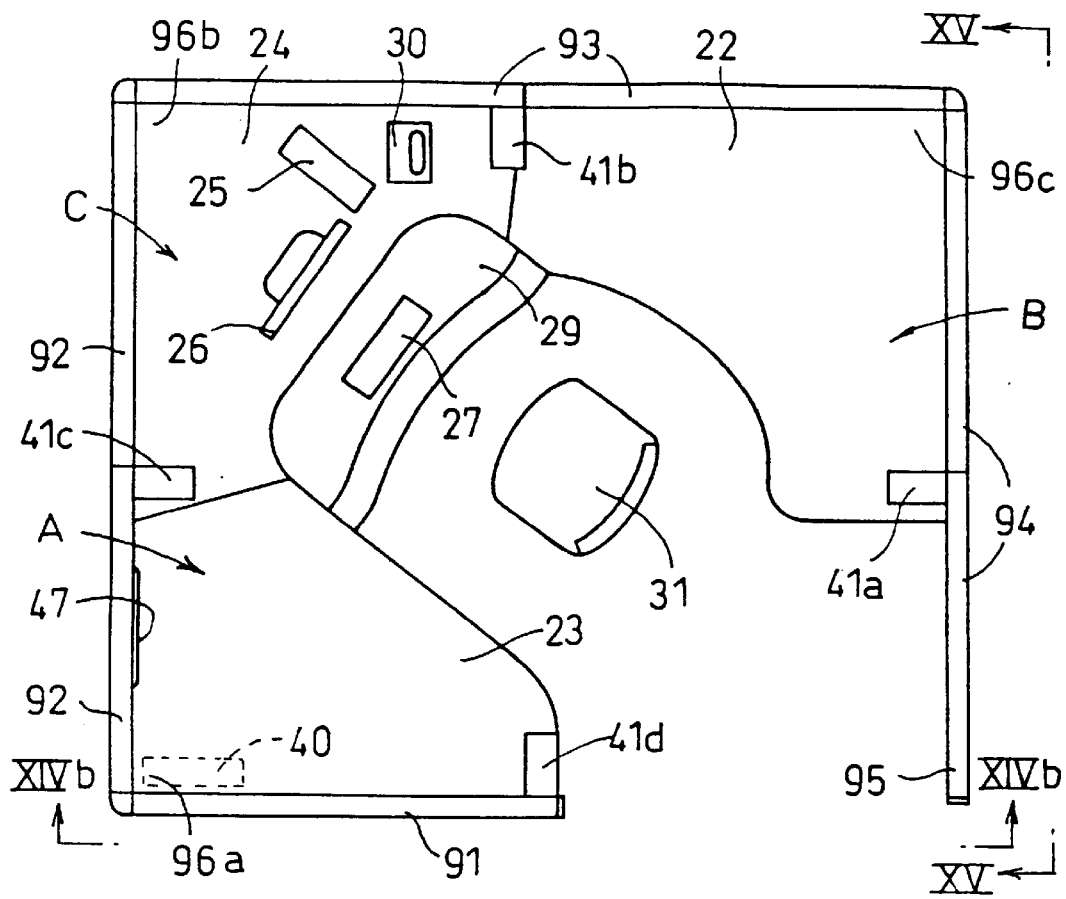
FIG. 14A is a sectional plan view showing a booth according to a second embodiment of the present invention.
Figure 14B:
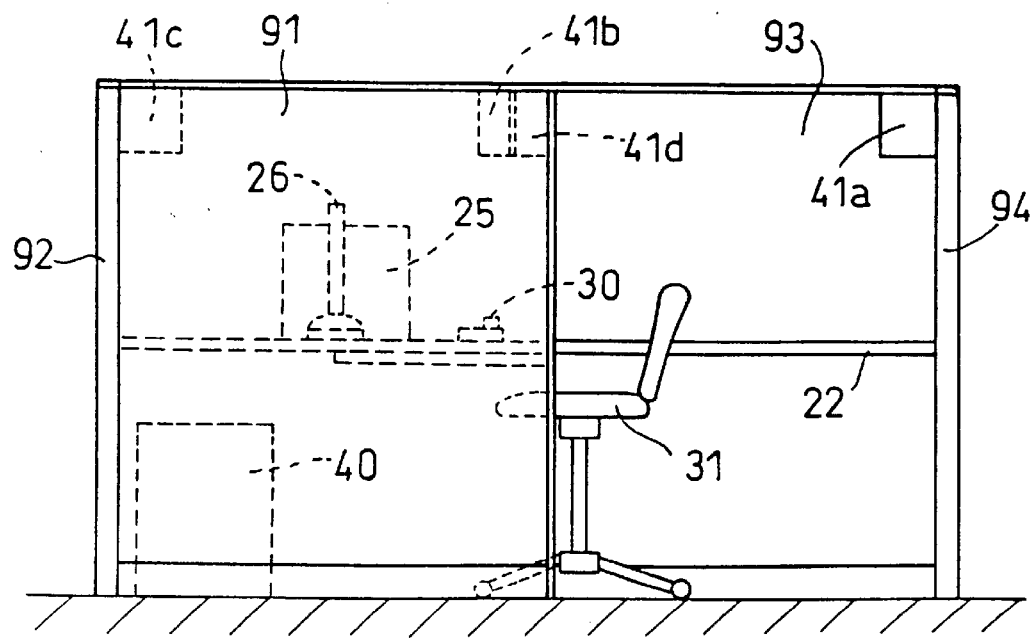
FIG. 14B is a sectional view taken along lines XIVb—XIVb in FIG. 14A.
Figure 15:
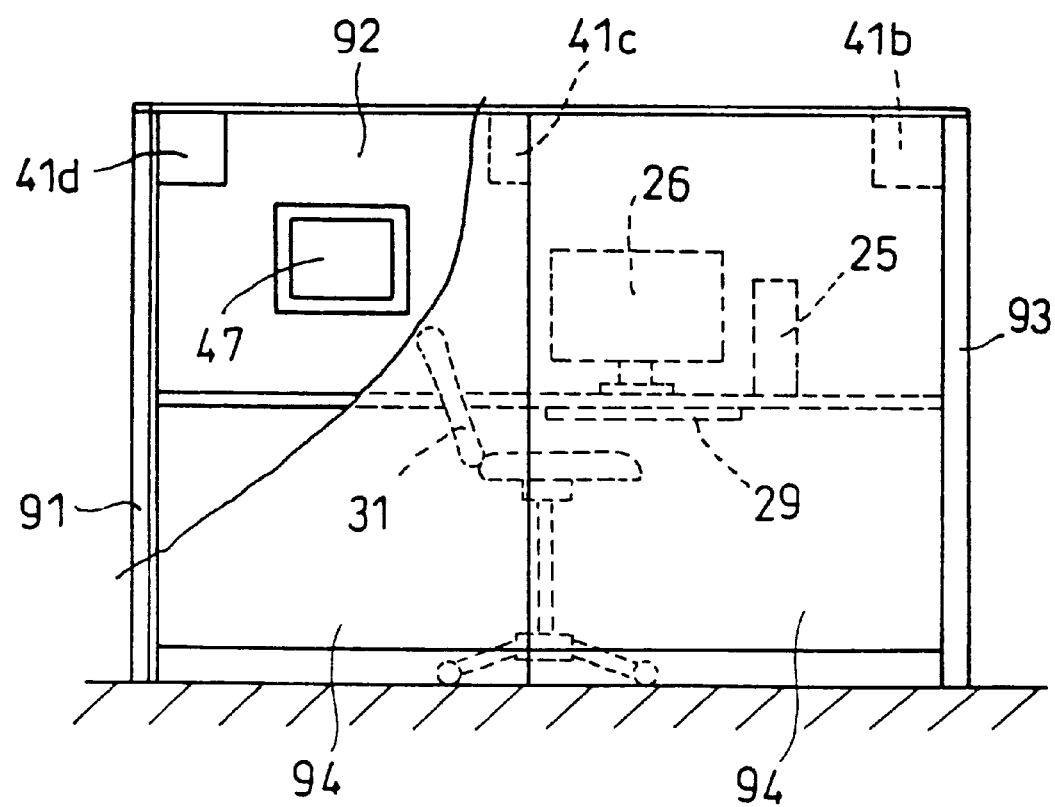
FIG. 15 is a fragmentally cut-out sectional view taken along lines XV—XV in FIG. 14A.

Reference is now made to FIGS. 14–15 illustrating a workspace system according to a second embodiment of the present invention.

In accordance with the second embodiment, an individual workspace is provided by dividing a larger space. To this end, three or more partitions may be used. In the illustrated example, as shown in FIG. 14A (plan view), four partitions 91–94 of the same height are utilized to form a rectangular compartment having an entrance adjacent to an anterior end 95 of the fourth partitions 94. Each partition is about 150 cm in height, though the present invention is not limited to this particular setting. For enhancing privacy protection, each partition may be as high as possible, so that even a tall person (who may be 190 cm or more in height) cannot normally look over it.

As in the first embodiment, the workspace of the second embodiment contains three desktops: a first desktop 23 in the first working environment A for the left hemisphere-dominant jobs, a second desktop 22 in the second working environment B for the right hemisphere-dominant jobs, and a third desktop 24 in the third working environment C for the operating a personal computer, facsimile machine, etc. With the illustrated arrangements, a job performer sitting on the chair 31 will face a first corner 96a when working at the first desktop 23. Similarly, the job performer will face a second corner 96b at the third desktop 24, and a third corner 96c at the second desktop 22. In the second embodiment again, the feel, material, shape, color, etc. of the three desktops 22–24 are different from each other in a manner helping the job performer concentrate on his or her work.

As in the first embodiment, the third desktop 24 supports the main unit 25 of a personal computer, a display 26 and a telecommunication device 30. An auxiliary desktop 29 is provided for supporting a keyboard 27. Further, the workspace is provided with four speakers 41a–41d for creating favorable acoustic environments, and with an environment setting controller 40 under the first desktop 23. In the second embodiment, a liquid crystal display 47 is embedded in the second partition 92.

Figure 16:
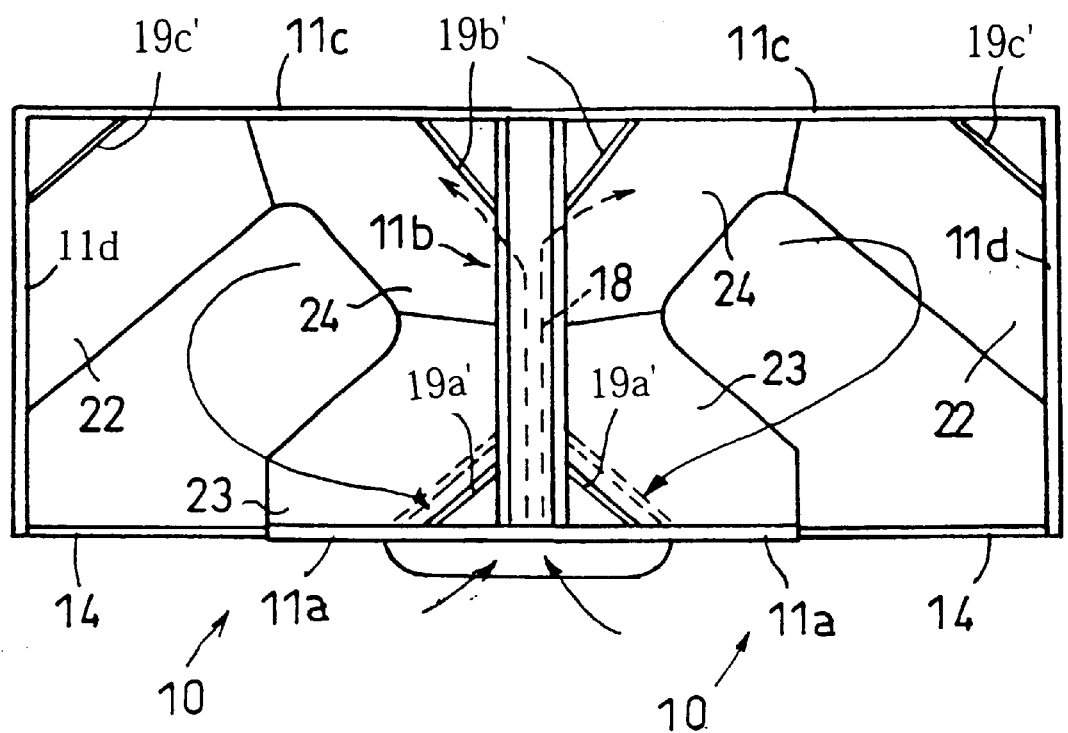
FIG. 16 is a schematic plan view showing a twin-booth according to a third embodiment of the present invention.

FIG. 16 is a plan view showing a workspace system according to a third embodiment of the present invention. In this system, two booths 10 are combined to form a single unit. Each booth 10 includes a first wall 11a, a second wall 11b, a third wall 11c and a fourth wall 11d. The booth 10 also includes a door 14 to provide a closed compartment. The second walls 11b of the respective booths 10 are arranged in facing relation, thereby providing an air circulation passage 18 therebetween.

The workspace contains three desktops 22–24 arranged to face three different corners 19a'–19c'.

Figure 17:
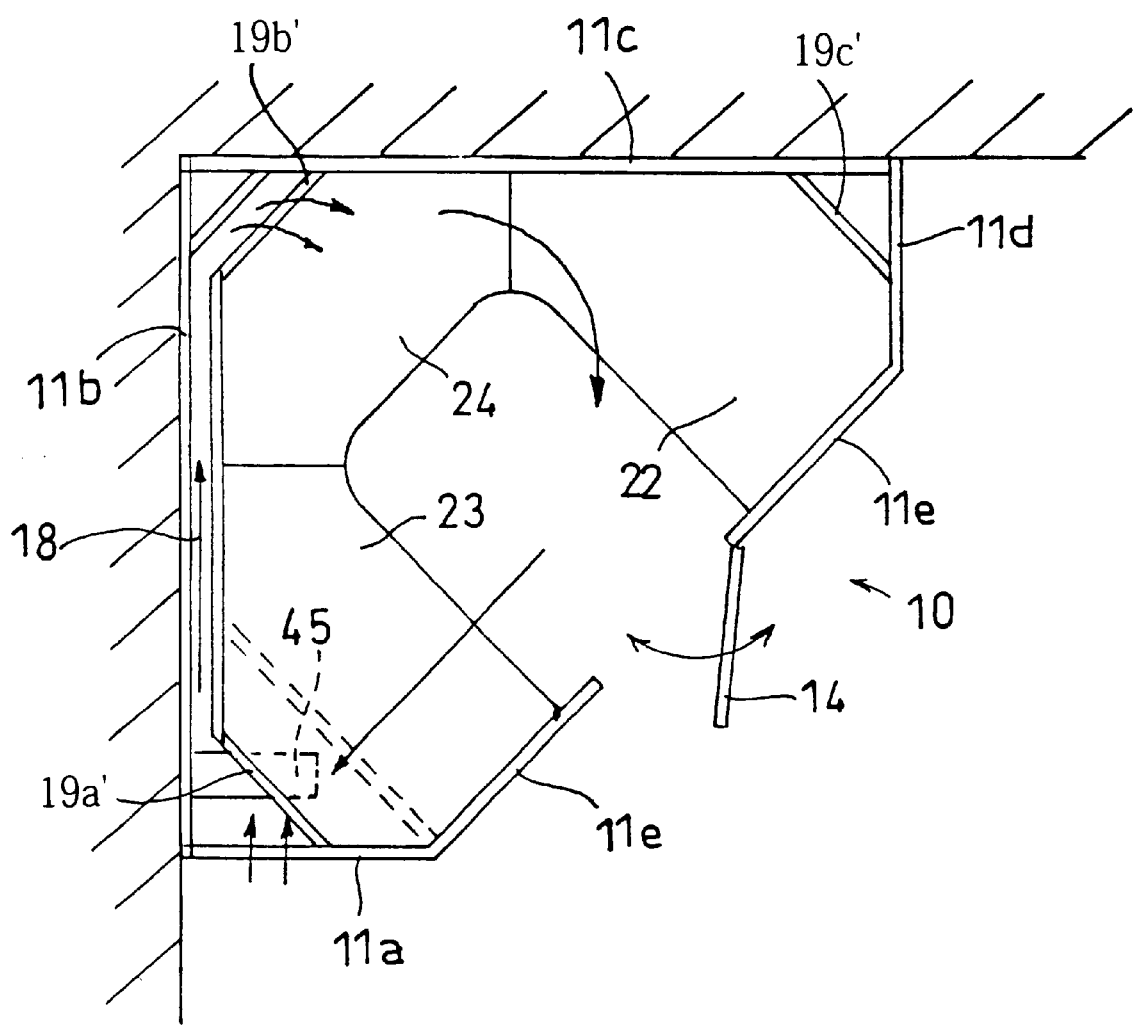
FIG. 17 is a schematic plan view showing a booth according to a fourth embodiment of the present invention.

FIG. 17 is a plan view showing a workspace system according to a fourth embodiment of the present invention. In this embodiment, the booth 10 has a pentagonal contour defined by first to fifth walls 11a–11e. As illustrated, a door 14 is provided in the fifth wall 11e. The booth 10 contains three desktops 22–24 facing three corners 19a'–19c'. An air circulation passage 18 extends from a first corner 19a' to a second corner 19b'. At the first corner 19a', an air-handling unit 45 is provided to flow the air along the circulation passage 18.

In the fourth embodiment, the second and the third walls 11b, 11c are held in close contact with the wall surfaces of a room.

For cost reduction, the second and the third walls 11b, 11c may be omitted. In this case, the wall surfaces of the room serve as a substitute for the omitted walls.

Figure 18:
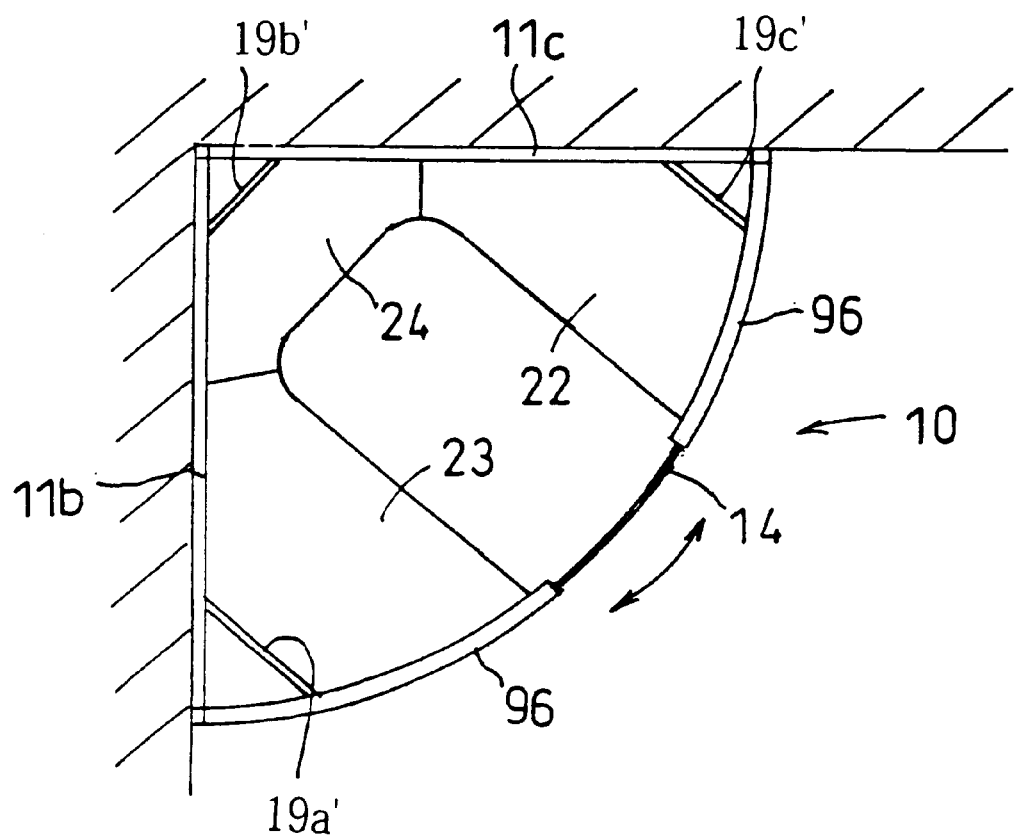
FIG. 18 is a schematic plan view showing a booth according to a fifth embodiment of the present invention.

FIG. 18 is a plan view showing a workspace system according to a fifth embodiment of the present invention. In this embodiment, a booth 10 includes a curved first wall 96 equipped with a sliding door 14, a second wall 11b, a third wall 11c, and three desktops 22–24 each facing a corresponding one of three corners 19a'–19c'. When opened, the door 14 is held in an inner space of the first wall 96.

Figure 19:
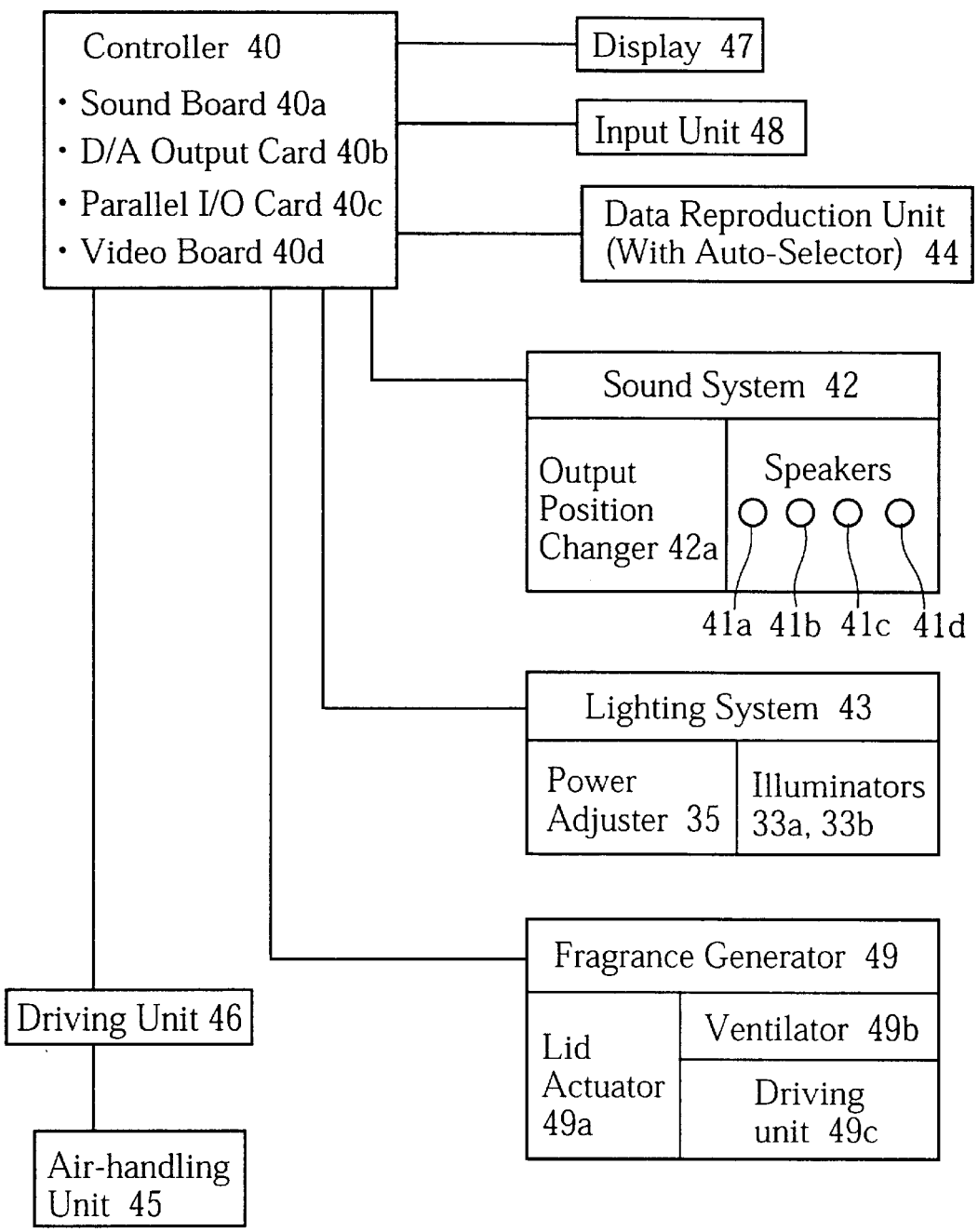
FIG. 19 is a block diagram showing the main components of an environment data generator used for the workspace system of the present invention.

Reference is now made to FIG. 19 illustrating the basic components of an environment data generator (or environment adjusting apparatus) used for creating the optimum (best or better) working conditions in the above-mentioned three working environments A, B and C.

As illustrated, the environment adjusting apparatus includes a controller 40 (provided with a sound board 40a, a D/A output card 40b, a parallel input/output card 40c, a video board 40d, etc.), a sound system 42 (an output position changing unit 42a, speakers 41a–41d, etc.), a lighting system 43 (including illuminators 33a–33b, a power adjusting unit 35, etc.), an acoustic data reproduction unit 44 (exchangers, etc.), an air-handling unit 45, a driving unit 46, a display 47, an input unit 48, and a fragrance generator 49 (a lid actuator 49a, a ventilator 49b, a driving unit 49c, etc.).

In addition to the above-mentioned parts, the controller 40 includes a CPU, a RAM, a ROM, a hard disk storage, etc. The acoustic data reproduction unit 44 is provided for reproducing sounds (music) from a storage medium such as a compact disk. In the lighting system 43, the power adjusting unit 35 is designed for controlling the brightness of the respective illuminators 33a, 33b. The driving unit 46 is provided for controlling the operation of the air-handling unit 45.

According to the present invention, optimum working conditions will be created based on environment setting programs run by the controller 40 when the identification number (or password), the characteristics of an individual, etc. are properly inputted through the input unit 48. To input necessary data, the unit 48 includes a mouse, a keyboard, etc.

The controller 40 causes the data on the above-mentioned optimum working conditions, together with the individual identification data, to be written to the hard disk mentioned above. Thereafter, when the individual (job performer) wishes to do a right or left hemisphere-dominant job in the booth 10, the environment setting programs are started, to read out the optimum working condition data from the hard disk upon verifying the individual ID data. In accordance with the retrieved data, the controller 40 may operate the acoustic data reproduction unit 44, the illuminators 33a–33b, the air-handling unit 45 and the fragrance generator 49.

As noted previously, the four speakers 41a–41d are provided in the booth 10. According to the present invention, the layout of the speakers 41a–41d is determined so that the right and the left ears of the job performer will receive generally the same level of sounds, no matter which desktop the job performer sits at.

Specifically, when the job performer sits at the desktop 22 for a right hemisphere-dominant job (see FIG. 2A for example), the speakers 41a and 41b are actuated to produce desired sounds. Likewise, when the job performer sits at the desktop 24 to perform a data-processing job using the computer, the telephone, etc., the speakers 41b and 41c are actuated. When the job performer sits at the desktop 23 for a left hemisphere-dominant job, the speakers 41c and 41d are actuated. The switching between the speakers 41a–41d is operated by the output position changing unit 42a of the sound system 42 based on the instructions issued from the controller 40. The speakers 41a and 41b may preferably be apart from each other through an angle in a range of 30°–140° as viewed from the job performer located at the center of the booth 10. The same relationship holds for the pair of the speakers 41b and 41c and for the pair of the speakers 41c and 41d.

In the acoustic data reproduction unit 44, use may be made of various kinds of data storage mediums in the form of a disk or tape. Specifically, to store white noise, sounds of the water (e.g. a river, sea, lake, etc.) or music, use is made of a CD, an MD, an MO disk, a DVD, analog magnetic tape, digital recording tape, etc. On the other hand, to store audio-visual data, use is made of a CD-ROM, an MO disk, a photo CD, a DVD, etc. The data reproduction unit 44 can accommodate several data storage mediums any one of which is selectively accessible by an automatic selector incorporated in the unit 44.

Preferably, the data reproduction unit 44 may include at least four data storage mediums. Specifically, a first storage medium may be used for storing a first type of acoustic data which serves, when reproduced, to prevent external noises (auditory or visual) from being perceived by the left hemisphere of the job performer engaged in left hemisphere-dominant work. A second storage medium may be used for storing a second type of acoustic (and visual) data which serves, when reproduced, to prevent external noises from being perceived by the right hemisphere of the job performer engaged in right hemisphere-dominant work. A third storage medium may be used for storing a third type of acoustic (and visual) data which serves, when reproduced, to make longer the effective duration ($\tau e$) of the auto-correlation function of the alpha waves (8–13 Hz) of the left hemisphere while the job performer is resting from the current left hemisphere-dominant job. A fourth storage medium may be used for storing a fourth type of acoustic (and visual) data which serves, when reproduced, to make longer the effective duration ($\tau e$) of the auto-correlation function of the alpha waves (8–13 Hz) of the right hemisphere while the job performer is resting from the current right hemisphere-dominant job.

All the above-mentioned four types of acoustic data may be stored in a single mass storage medium. However, for ensuring quick reproduction of required data, preferably a plurality of storage mediums may be used (one medium for one data type), as stated above.

According to the present invention, the illuminators 33a, 33b can be adjusted in brightness in accordance with the visual acuity of the job performer. Specifically, the illuminance (lux) of the illuminators 33a–33b is adjusted to become equal to $\mu\times$(the visual acuity of the job performer), where $191 \leq \beta \leq 625$. Preferably, the illuminance may be rendered greater in performing a left hemisphere-dominant job than in performing a right hemisphere-dominant job.

The fragrance generator 49 includes a predetermined number of containers for holding different kinds of sweet-smelling substances (liquid or solid). Each container is provided with a lid which is automatically actuated to selectively let out the contained fragrance. Instead of having such a lid, each container may be provided at its bottom with a tap to selectively let the perfume dribble. To spread the fragrance effectively in the booth 10, use may be made of a fan for example. Depending on the type, the fragrance may activate or calm down the right or left hemisphere.

Reference is now made to FIGS. 20–39 illustrating how the optimum working environment will be created for each job performer who utilizes the booth 10. For the creation of the optimum conditions (relating to fragrance, sound type, sound loudness, illumination, etc.), use may be made of an environmental condition setting program and an environmental data generating program. The former (the environmental condition setting program) is used for determining environment optimum values corresponding to the desired working environments (i.e., the ones suitable for right hemisphere-dominant jobs, or left hemisphere-dominant jobs, or the other kinds of jobs). The determination of the optimum values is performed based on personal data of respective job performers. The thus obtained optimum values and the personal data of each job performer will be stored in a suitable memory. On the other hand, the latter (the environmental data generating program) is used for reading out the environment optimum values from the memory, and also for operating the environment data generator (shown in FIG. 19) based on the above environment optimum values.

The above two programs may initially be stored in a CDROM for example. Then, the programs may be installed in the controller 40 (which is an electronic apparatus such as a computer). With these programs running, the controller 40 manages the operations of the environment data generator.

Figure 21:
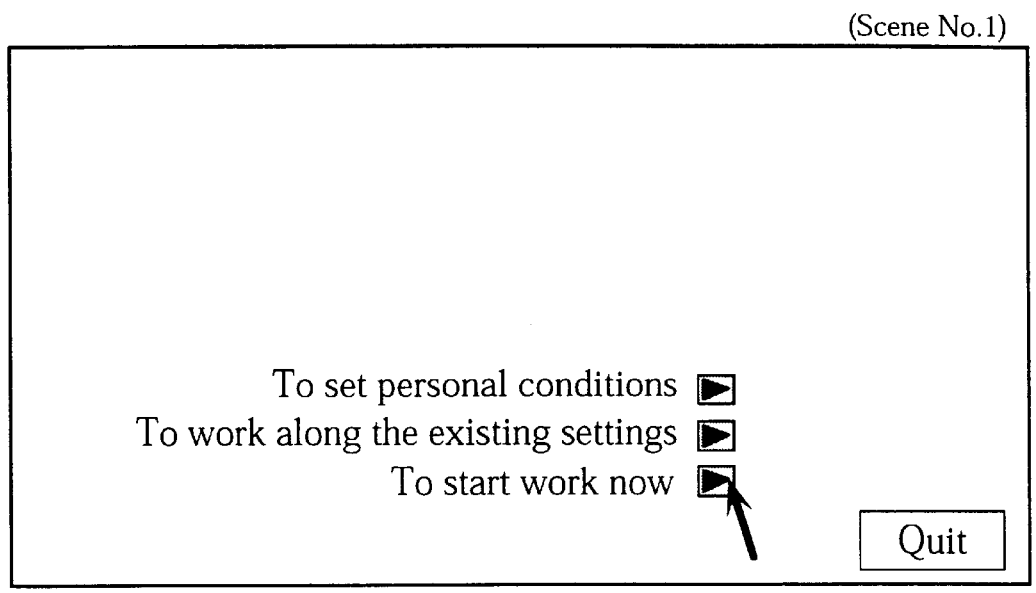
FIG. 21 illustrates Scene No. 1 to appear on a monitor used for the workspace system of the present invention.

Typically, a job performer wishing to use the booth 10 may first turn of the illuminators 33a–33b upon entering the booth 10. Then, the job performer turns on the controller 40 to start the environmental condition setting program. As a result, Scene No. 1 as shown in FIG. 21 will appear on the monitor of the liquid crystal display 47.

Figure 22:
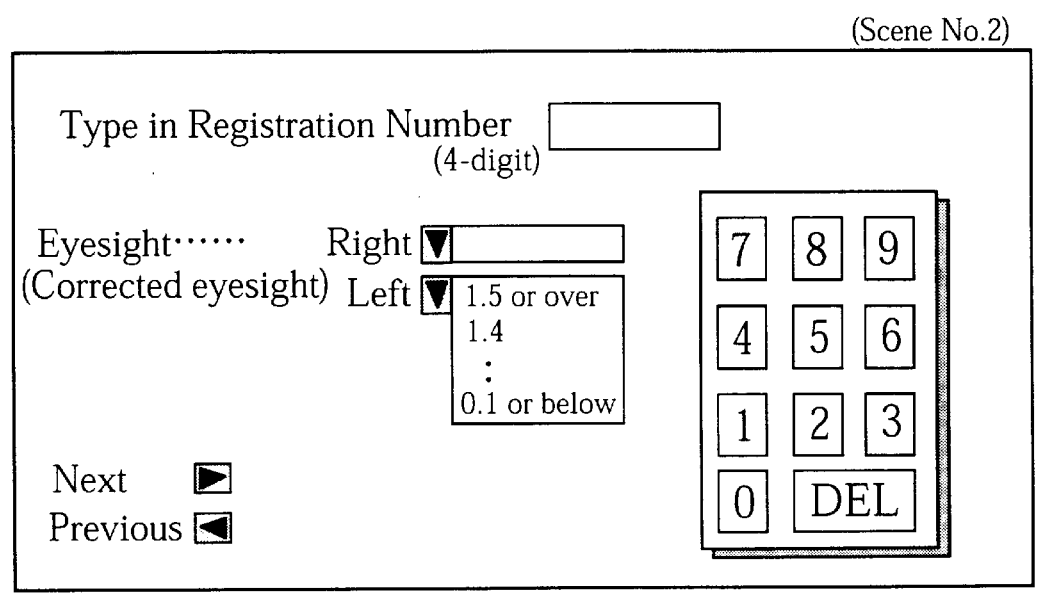
FIG. 22 illustrates Scene No. 2 to appear on a monitor used for the workspace system of the present invention.

At Scene No. 1, when the job performer clicks on the uppermost button for personal environment settings, the scene turns to Scene No. 2 (as shown in FIG. 22). If the personal environment settings have done before by the same job performer (in this case, the personal identification number and the environment optimum values have been registered in the controller 40), the job performer may click on the middle button, so that he can start the job in accordance with the existing settings. In this case, Scene No. 14 as shown in FIG. 34 will appear. Thereafter, the job performer starts the environmental data generating program, so that his favorite working conditions will be created.

Figure 39:
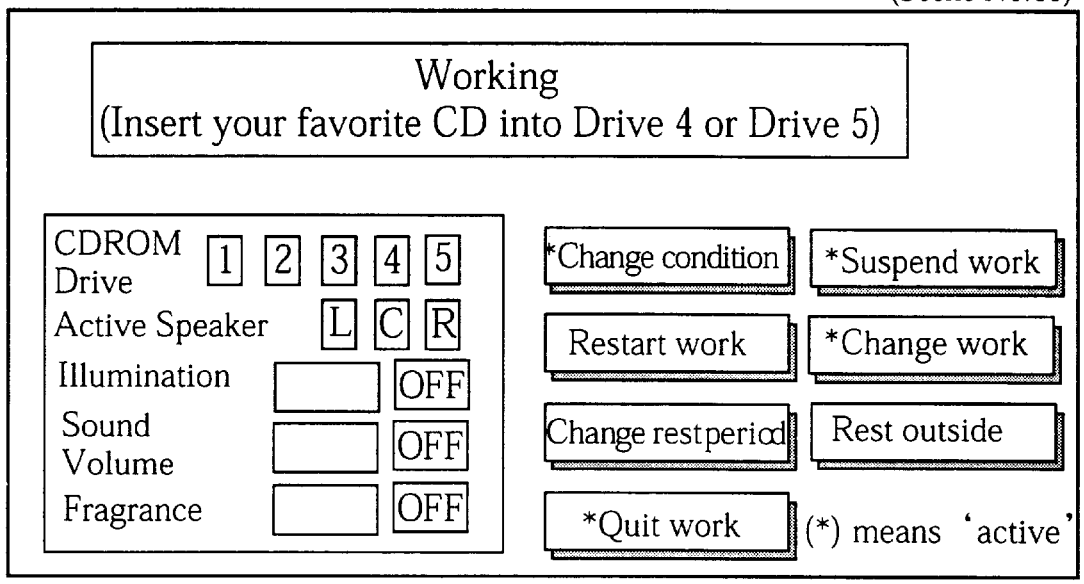
FIG. 39 illustrates Scene No. 20 to appear on a monitor used for the workspace system of the present invention.

At Scene No. 1, if the job performer wants no automatic settings to be made, he may click on the lowermost button for starting to work immediately. In this case, Scene No. 20 as shown in FIG. 39 will appear, and the environmental data generating program is started.

Figure 20:
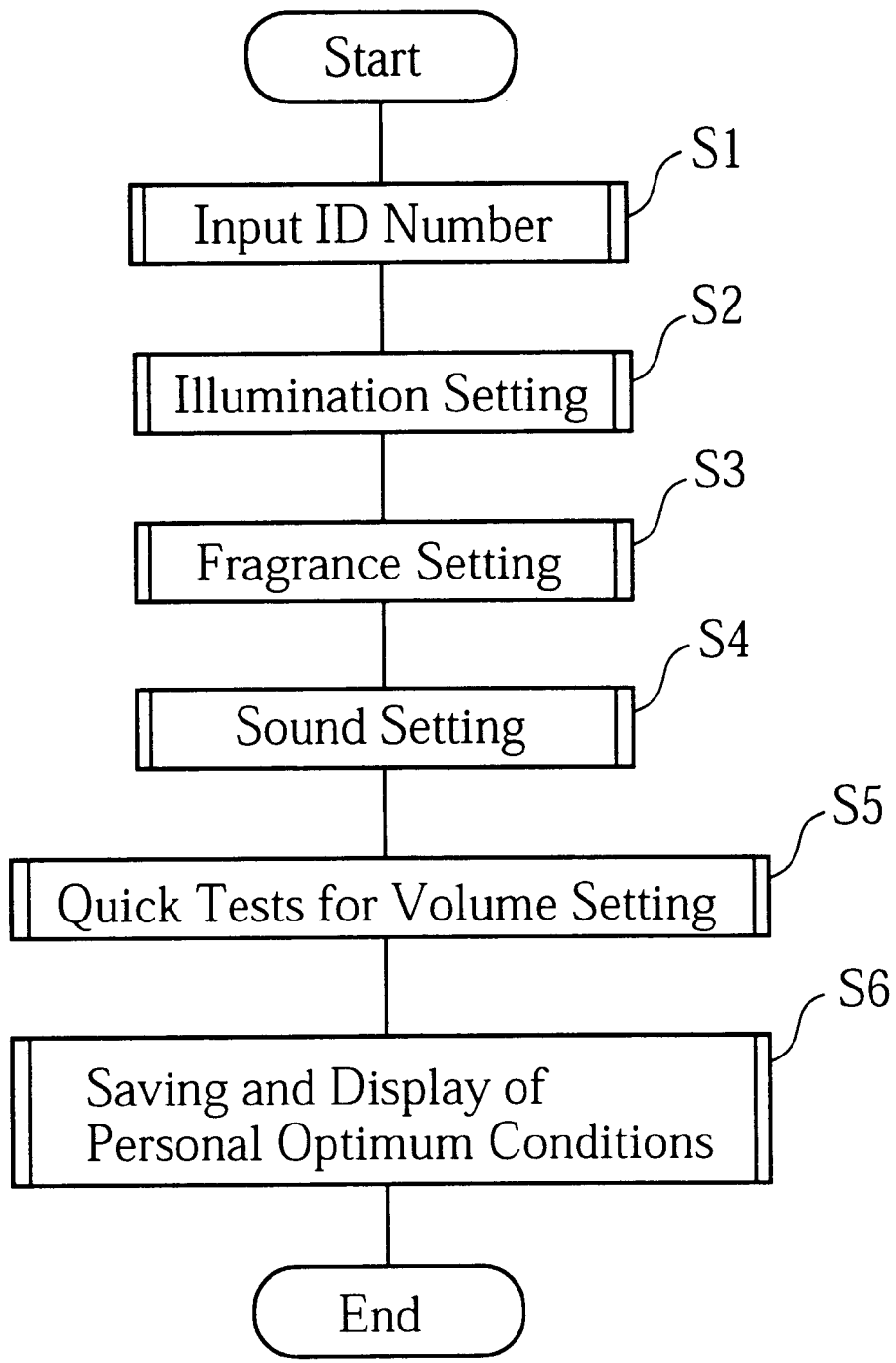
FIG. 20 is a main flow chart showing an environmental condition setting procedure.

At Scene No. 2 shown in FIG. 22 (meaning that the job performer clicked on the uppermost button at Scene No. 1), the job performer inputs his personal identification number (S1 in FIG. 20). This ID number does not need to be determined by a strict rule. For instance, the job performer may use any 4-digit number (his birthday, registration number allotted from his company, etc.) for the ID number. The input of the ID number may be performed through the numeric keypad appearing on the monitor or by the input unit 48 (provided with a keyboard for example).

Then, the job performer will go through Steps 2–5 (as shown in FIG. 20) for determination of the user-specific environment optimum values.

Specifically, at Step 2, lighting conditions will be set in order to determine the suitable illuminance of the illuminators 33a–33b. To this end, at Scene No. 2 (FIG. 22), the job performer may input his visual acuity. In the illustrated example, the eyesight of the right eye and the corrected eyesight of the left eye need to be inputted.

Then, the job performer goes to Scene No. 3 (as shown in FIG. 23) for setting fragrance conditions (S3 in FIG. 20). There, the job performer inputs data on his handedness. If the job performer is a right-handed person, he chooses the upper circle.

If the job performer is a left-handed person, he chooses the lower circle. Even if the job performer is two-handed, he is supposed to choose either one of the two options. In this case, the job performer decides on which hand he uses more often than the other in doing work.

Then, the job performer goes to Scene No. 4 (as shown in FIG. 24), and select his favorite fragrance. To make different the environmental conditions for the work period and the relaxation period, two kinds of fragrance are to be selected. Either one of the selected fragrances will be generated by the fragrance generator 49 during the work or rest period.

Then, the job performer goes to Scene No. 5 (as shown in FIG. 25) to perform the setting of acoustic conditions (S4 in FIG. 20). At this stage, the environmental data generating program is started. In the illustrated example, the acoustic data reproduction unit 44 (provided with an automatic selector) is loaded with three CDROMs by default. Specifically, CDROM Drive1 is loaded with a CDROM titled "3-minute Relax", CDROM Drive2 is loaded with a CDROM titled "Sounds of Waves", and CDROM Drive3 is loaded with a CDROM titled "Getting Smart" for example. When there is no such CDROM found in the relevant drive, a beep sound may be generated to attract the job performer's attention.

Then, the job performer may go to Scene No. 6 (as shown in FIG. 26) if he wishes to play music on a CDROM other than the above-mentioned three CDROMs prepared by default. In this case, the job performer inserts a CDROM of his own choice into Drive4 (used for reproduction of natural sounds) or Drive5 (used for reproduction of music). The job performer can register the titles of these CDROMs by typing in the text box X (for natural sounds) or text box Y (for music).

Then, the job performer goes to Scene No. 7 (as shown in FIG. 27) to performing the setting of sound level (loudness) suitable for doing jobs in the booth 10. For this setting, the job performer is required to take brief tests which may be a kind of video game rather than a test. To help the job performer prepare for the tests, Scene No. 8 (as shown in FIG. 28) will appear on the monitor when the job performer clicks on the uppermost button ("Next") at Scene No. 7. When the job performer clicks on the start button at Scene No. 8, a relaxation period (of about 3 minutes for example) will start. During this period, one randomly selected piece of music may be reproduced from the CDROM loaded in Drive1. The loudness of the reproduced music may be about 40 dB. The music is reproduced from the speakers 41c and 41d (see FIG. 14A). The job performer may be required to sit at the desktop 23 to face the first corner 96a, so that he can see the liquid crystal display 47. In a preferred embodiment, several (9 for example) short movies (about 20 seconds for each) may be played on the monitor of the display 47. The video files (e.g. jpg files) for the play may be randomly selected from the total of 50 files stored in the hard disk drive. For the relaxation time, the illuminance of the illuminators 33a–33b may be rendered minimum (200 lux for example)

If the job performer wishes to skip the relaxation menu at Scene No. 7 (FIG. 27), he clicks on the lowermost button. In this case, Scene No. 13 (as shown in FIG. 33) will appear, and the default environmental conditions will beset. For instance, the loudness of sound will be automatically set at 60 dB.

After the above relaxation period is over, Scene No. 9 (as shown in FIG. 29) will automatically appear for presenting an explanation for the first leg of the brief tests. After reading the comments on the scene, the job performer may click on the "Start" button. Then, Scene No. 10 (as shown in FIG. 30) will appear. In the first leg of the tests, natural sounds will be reproduced from the disk loaded in Drive2 or Drive4. Listening to the sound, the job performer will do some addition quiz. Specifically, as shown in FIG. 30, a pair of one-digit figures will appear on the monitor (5 and 8 in the illustrated example) Upon finding the pair, the job performer is supposed to calculate the sum of the two numbers. In the case of the illustrated example, the result is 13 (=5+8). Thus, the job performer will click on "3" (the number of units or the digit in the lowest place) in the keypad. When the answer is correct, the next pair will appear on the monitor. Preferably, one pair and another may be displayed in different color. This test will continue until the addition of the last pair (the 48th pair, for example) is successfully over.

During the addition test, the loudness of the sound is changed several times. For instance, the sound level may be set at 40 dB while the job performer is tackling the first set of 8 additions (Problems 1–8). Then, the sound level may be kept at 50 dB while the job performer is tackling the second set of 8 additions (Problems 9–16). Then, the sound level maybe kept at 60 dB while the job performer is tackling the third set of 8 additions (Problems 17–24). Thereafter, the sound level may be kept again at 40 dB for the fourth set of 8 additions (Problems 25–32), then at 50 dB for the fifth set of 8 additions (Problems 33–40) and finally at 60 dB for the sixth set of 8 additions (Problems 41–48).

For each set, the time taken by the job performer to solve the 8 additions is automatically measured. For instance, the job performer may take X1 seconds to solve the first set of problems (under the sound level of 40 dB), X2 seconds for the second set of problems (under the sound level of 50 dB), X3 seconds for the third set of problems (under the sound level of 60 dB), X4 seconds for the fourth set of problems (under the sound level of 40 dB), X5 seconds for the fifth set of problems (under the sound level of 50 dB), and X6 seconds for the sixth set of problems (under the sound level of 60 dB).

Thereafter, the mean values of the times taken to solve the additions are calculated for each sound level. In the above example, two times X1 and X4 have been obtained under the 40 dB condition. Thus, for 40 dB, the mean value is calculated as $M1=(X1+X4)/2$. Likewise, the mean value for 50 dB is calculated as $M2=(X2+X5)/2$, and the mean value for 60 dB is calculated as $M3=(X3+X6)/2$.

Thereafter, the three mean values M1–M3 are compared with each other, to determine the smallest one. Supposing now that the mean value M1 is the smallest, the sound level 40 dB (which corresponds to the mean value M1) is adopted as the suitable sound level for the job performer to do a left hemisphere-dominant job.

Figures 31, 32:
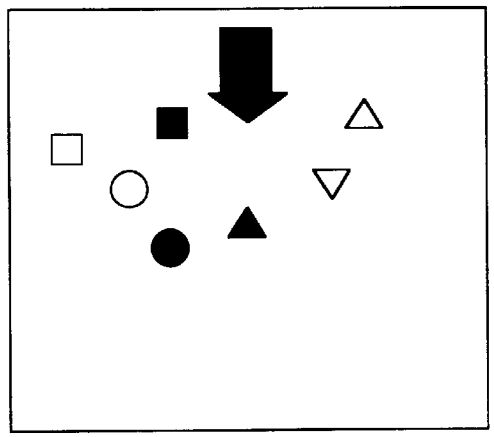
FIG. 31 illustrates Scene No. 11 to appear on a monitor used for the workspace system of the present invention.
FIG. 32 illustrates Scene No. 12 to appear on a monitor used for the workspace system of the present invention.

After the above-described first leg of the brief tests is over, Scene No. 11 (as shown in FIG. 31) will automatically appear on the monitor, presenting the explanations for the second leg of the brief tests. The second leg of the tests is for setting the optimum conditions suitable for performing a right hemisphere-dominant job. When the job performer clicks on the "Start" button, Scene No. 12 (as shown in FIG. 32) will automatically appear on the monitor.

The second leg may include six trials (Trials 1–6). There may be an interval of 1 second between one trial and the next. Throughout these trials, rather toneless music is being played from the CDROM loaded in Drive3 or Drive5. The sound level of the music, however, is varied for respective trials. Specifically, the sound level may be set to 40 dB for the first trial (Trial 1) and the fourth trial (Trail 4), to 50 dB for the second trail (Trial 2) and the fifth trial (Trial 5), and to 60 dB for the third trial (Trail 3) and the sixth trial (Trial 6).

In each trial, as shown in FIG. 32, a number of different figures will appear in the rectangular test field on the monitor. In the illustrated example, 8 kinds of figures (●, ○, □, ■, ▲, ▽, △, ▼) are used. The total number of the figures to appear on the monitor is 50 for each trial. These figures are programmed to fall down in the test field at a certain rate. For instance, when the size of the test field is 10 cm×10 cm, the average falling rate may be set so that ten figures will fall through the test field in 2 seconds. Preferably, the falling rate increases gradually.

As shown in FIG. 32, an automatically selected 'target' figure will appear at the upper left corner of the monitor. In the illustrated example, the target is a while triangle pointing upward (△). In each trial, the job performer is required to find ones, among the randomly falling figures, that are the same as the 'target', and to click on them. When the job performer succeeds in clicking on the right one, a relatively high-tone sound may be made, and a point '1' is scored. On the other hand, if the job performer clicks on a wrong one, a relatively low-tone sound may be made, and a point '−1' is recorded. Preferably, among all the 50 figures, there may be 10 pieces of the correct figure.

After one trial is over, the total score for this particular trial is calculated. For instance, when the job performer has got seven correct figures and two wrong figures in Trial 1 (with the sound level of 40 dB), the total score ('Score1') is 5 (=7−2). Likewise, Scores 2–6, which correspond to Trials 2–6 respectively, are obtained. As readily understood, the possible best score is 10 (ten correct figures and no wrong figure), while the possible worst score could be any negative number.

In the above-described second leg of the tests, the performer may get the highest score in Trial 2, for example. In this case, the sound level 50 dB (under which Trial 2 has been performed) is adopted as the suitable sound level for the job performer to do a right hemisphere-dominant job.

After the second leg of the tests is over, the storage device (hard disk) of the controller 40 stores the ID number of the job performer together with the above-mentioned personal data (eyesight, handedness, etc.) and the optimum working conditions data resulting from the brief tests described above. Then, Scene No. 13 (as shown in FIG. 33) will appear, to present the optimum environmental conditions of the job performer. Specifically, as illustrated in the figure, the job performer's ID number, eyesight (the better one only), handedness, favorite sounds (together with sound levels), and favorite fragrances are displayed. It should be noted here that the sound level for relaxation time is invariable (40 dB).

At Scene No. 13, when the job performer clicks on the lowermost button, another session of optimum condition setting (with other CDROMs) will be started. In this case, Scene No. 6 (FIG. 26) will reappear. Thereafter, the job performer is required to take the above-described tests once again. According to the present invention, history data on the first optimum condition setting and subsequent optimum condition setting(s) will be stored in a registration data list prepared in the controller 40.

At Scene No. 13, when the job performer clicks on the 'End' button, the monitor goes back to the initial scene (Scene No. 1) as shown in FIG. 21. Thereafter, the job performer may click on the middle button to start the job in accordance with the registered settings, or may click on the 'System End' button to turn down the system. In the latter case, the job performer will not do any work on this particular occasion, and may leave the booth 10 after pulling out his own CDROMs from the drives.

When the job performer clicks on the middle button at Scene No. 1, the environmental data generating program is started, and Scene No. 14 (FIG. 34) will be displayed on the monitor. Then, the job performer types his personal ID number into the textbox by the on-screen keypad. If the typed number is not found in the registered data, a comment such as 'No Registration Found' will appear. On the other hand, when the correct number is entered (i.e., the entered number is found in the database stored in HDD), the job performer can go on to the next step, by clicking on the 'Next' button. In this case, Scene No. 15 (FIG. 35) will appear, to prompt the job performer to insert his favorite CDROM into Drive4 or Drive5.

Then, the job performer clicks on the 'Next' button, to display Scene No. 16 (as shown in FIG. 36). At this scene, the job performer chooses one from the two job categories. If he plans to do a left hemisphere-dominant job, he clicks on the upper button. Otherwise, he clicks on the lower button. In the illustrated example, only two selection buttons are provided. Of course, more selection buttons may be used at Scene No. 16. Preferably, however, the classification may be as simple as possible to prevent the job performer from getting confused in making his selection.

When the upper or lower selection button is clicked at Scene No. 16, Scene No. 17 (as shown in FIG. 37) will appear on the monitor. Here, the job performer is required to enter his estimated work time. Then, he may click on the 'Next' button, which causes Scene No. 18 (as shown in FIG. 38) to appear.

At Scene No. 18, the job performer is asked if he wishes to take some relaxation time before beginning to work. When 'Yes' button is clicked, a prearranged relaxation session begins. This session may continue for about 3 minutes. More specifically, when 'Yes' is pressed, the controller 40 turns on the acoustic data reproduction unit 44. Then, the unit 44 automatically selects the appropriate storage medium and reproduces relaxing music via the sound system 42. At the same time, the controller 40 reduces the illuminance of the illuminators 33a–33b, to help the job performer to relax.

When the relaxation session is over, Scene No. 19 (as shown in FIG. 39) will appear. The same scene also appears when the job performer clicks on 'No' button at Scene No. 18. At this stage, the job performer can insert a CDROM of his selection into CDROM Drive4 or CDROM Drive5. Thereafter, the output position changing unit 42a of the sound system 42 is turned on, thereby causing a desired piece of music or sound to be produced from an appropriate pair of the speakers. At the same time, the controller 40 supplies instructions to the power adjusting unit 35, so that the illuminance of the illuminators 33a–33b is adjusted to suit the work the job performer is about to begin.

Preferably, the job performer may take a 15-minute break after working for e.g. 60 minutes. To prevent the job performer from continuing to work beyond such a limit, the controller 40 may ring an alarm to inform the job performer of the beginning of a break time. In addition, the controller 40 may ring an alarm when the break time is over. In this manner, the job performer is urged to resume the work. Still further, when the planned work time is over (the estimated length of time has been inputted at Scene No. 17, as stated above), an alarm is rung. Then, through the monitor, the job performer may be asked if he wises to continue to work or quit. If he wishes to continue to work, further questions about the kind of the next job, estimated duration of the next job, etc. may be put to the job performer.

Referring back to FIG. 39, Scene No. 19 continues to be displayed on the monitor while the job performer is engaged in his work. As illustrated in the figure, Scene No. 19 is provided with several selection buttons such as a 'Change condition', button, a 'Suspend work' button, a 'Restart work' button, a 'Change work' button, a 'Change rest period' button, a 'Rest outside' button and a 'Quit work' button.

To terminate the current use of the booth 10, the job performer clicks on the 'Quit work' button, thereby ending the environmental data generating program. Thereafter, the job performer turns off the controller 40 and the lighting system 43.

According to the present invention, the job performer sits at different desktops, depending upon the nature of the work.

In this manner, the job performer can refresh himself actively whenever he tackles a different kind of job, which is advantageous to improving the efficiency of work. When the job performer sits at the third desktop 24 (see FIG. 2A) to make a telephone call for example, it is preferable to keep quiet the inside of the booth 10.

The liquid crystal display 47 (see FIGS. 14A and 15) may be replaced by a projector. In this case, slides or films may be projected onto a screen put on the wall of the booth 10, or onto the wall itself.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A workspace system comprising:
   a working region including a first environment suitable for a left hemisphere-dominant job,
   a second environment suitable for a right hemisphere-dominant job, a third environment different from the first and the second environments, and a seating area in which a job performer takes a seat;
   a first desktop for the first environment;
   a second desktop for the second environment; and
   a third desktop for the third environment;
   wherein the first, the second and the third environments are disposed about the seating area; and
   wherein the first, the second and the third desktops are different from each other in at least one of surface texture, material and color.

2. The workspace system according to claim 1, wherein the third desktop is arranged between the first and the second desktops.

3. The workspace system according to claim 1, further comprising a chair placed in the seating area.

4. The workspace system according to claim 3, wherein the seating area is located at a center of the working region.

5. The workspace system according to claim 1, further comprising an optimum environment data generating system for providing the job performer with different stimuli in accordance with the respective environments.

6. The workspace system according to claim 1 further comprising a booth that accommodates the working region.

7. The workspace system according to claim 6, wherein the booth is formed with a doorway for access to the working region.

8. The workspace system according to claim 1, wherein the first desktop for the first environment has a warm color and a smooth surface.

9. The workspace system according to claim 1, wherein the second desktop for the second environment is made of natural wood exhibiting grains with a plurality of exposed knots while providing a rough feel and having a bright color.

10. The workspace system according to claim 1, wherein the third desktop for the third environment provides a cold appearance and a smooth touch.

11. The workspace system according to claim 1, wherein the first desktop for the first environment has a warn color and a smooth surface, the second desktop for the second environment being made of natural wood exhibiting grains with a plurality of exposed knots while providing a rough feel and having a bright color.

12. The workspace system according to claim 1, wherein the first desktop for the first environment has a warm color and a smooth surface, the second desktop for the second environment being made of natural wood exhibiting grains with a plurality of exposed knots while providing a rough feel and having a bright color, the third desktop for the third environment providing a cold appearance and a smooth touch.

13. A workspace system comprising:
   a working region including a first environment suitable for a left hemisphere-dominant job, a second environment suitable for a right hemisphere-dominant job, a third environment different from the first and the second environments, and a seating area in which a job performer shifts in position;
   a plurality of walls that define a booth accommodating the working region;
   a first desktop for the first desktop;
   a second desktop for the second environment;
   a third desktop for the third environment; and
   a doorway formed in the booth for causing the seating area to communicate with an outside of the booth;
   wherein the first, the second and the third environments are arranged about the seating area; and
   wherein the first, the second and the third desktops are different from each other in at least one of surface texture, material and color.

14. The workspace system according to claim 13, wherein the first, the second and the third desktops are arranged in a series to make close contact one after another, and wherein two of the first, the second and the third desktops are separate from each other across the seating area as viewed from the doorway.

15. The workspace system according to claim 13, wherein the booth further includes a ceiling and a door for opening and closing the doorway.

16. The workspace system according to claim 15, further comprising a lighting unit supported by the ceiling of the booth, and a light adjustor for adjusting brightness of the lighting unit.

17. The workspace system according to claim 13, wherein the booth is provided with an optimum environment data generator for providing the job performer with different stimuli in accordance with the first, the second and the third environments.

18. The workspace system according to claim 17, further comprising a controller that operates the optimum environment data generator based on personal data of the job performer.

19. The workspace system according to claim 18, wherein the controller determines work environment optimum values based on the personal data of the job performer, wherein the optimum environment data generator operates based on the work environment optimum values, and wherein the work environment optimum values relate to sound, fragrance and illumination.

* * * * *